United States Patent
Czanta et al.

(10) Patent No.: US 10,106,741 B2
(45) Date of Patent: *Oct. 23, 2018

(54) LIQUID-CRYSTALLINE MEDIUM AND ELECTRO-OPTICAL LIQUID-CRYSTAL DISPLAY

(71) Applicant: Merck Patent GmbH, Darmstadt (DE)

(72) Inventors: Markus Czanta, Darmstadt (DE); Izumi Saito, Darmstadt (DE); Sven Baran, Babenhausen (DE); Christian Jasper, Seligenstadt (DE); Lars Lietzau, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/438,264

(22) PCT Filed: Oct. 23, 2013

(86) PCT No.: PCT/EP2013/003195
§ 371 (c)(1),
(2) Date: Apr. 24, 2015

(87) PCT Pub. No.: WO2014/063817
PCT Pub. Date: May 1, 2014

(65) Prior Publication Data
US 2015/0284636 A1 Oct. 8, 2015

(30) Foreign Application Priority Data

Oct. 25, 2012 (DE) ........................ 10 2012 020 940

(51) Int. Cl.
| | | |
|---|---|---|
| G02F 1/1333 | (2006.01) | |
| C09K 19/34 | (2006.01) | |
| C09K 19/04 | (2006.01) | |
| C09K 19/30 | (2006.01) | |

(52) U.S. Cl.
CPC .......... *C09K 19/3402* (2013.01); *C09K 19/04* (2013.01); *C09K 19/3001* (2013.01); *C09K 19/3003* (2013.01); *C09K 19/3028* (2013.01); *C09K 19/3048* (2013.01); *C09K 2019/044* (2013.01); *C09K 2019/0451* (2013.01); *C09K 2019/0455* (2013.01); *C09K 2019/0466* (2013.01); *C09K 2019/301* (2013.01); *C09K 2019/303* (2013.01); *C09K 2019/3004* (2013.01); *C09K 2019/305* (2013.01); *C09K 2019/3009* (2013.01); *C09K 2019/3016* (2013.01); *C09K 2019/3021* (2013.01); *C09K 2019/3422* (2013.01)

(58) Field of Classification Search
CPC ................ C09K 19/3402; C09K 19/04; C09K 19/3003; C09K 19/3028; C09K 19/3048; C09K 19/3001; C09K 2019/044; C09K 2019/0451; C09K 2019/0455; C09K 2019/0466; C09K 2019/3004; C09K 2019/301; C09K 2019/3021; C09K 2019/305; C09K 2019/303; C09K 2019/3009; C09K 2019/3016; C09K 2019/3422; G02F 1/1333
USPC ....................................... 252/299.63; 428/1.1
See application file for complete search history.

(56) References Cited

U.S. PATENT DOCUMENTS

| | | | |
|---|---|---|---|
| 6,544,602 B1 | 4/2003 | Hirschmann et al. | |
| 7,078,079 B2 | 7/2006 | Heckmeier et al. | |
| 7,291,367 B2 | 11/2007 | Kirsch et al. | |
| 7,405,026 B2 | 7/2008 | Kawakami | |
| 7,449,222 B2* | 11/2008 | Heckmeier | ........ C09K 19/3402 252/299.61 |
| 7,838,090 B2* | 11/2010 | Wittek | ........ C09K 19/42 252/299.61 |
| 7,842,358 B2 | 11/2010 | Czanta et al. | |
| 8,231,806 B2 | 7/2012 | Czanta et al. | |
| 8,404,150 B2 | 3/2013 | Wittek et al. | |
| 8,834,744 B2 | 9/2014 | Wittek et al. | |
| 2004/0108489 A1 | 6/2004 | Okabe et al. | |
| 2004/0173774 A1 | 9/2004 | Heckmeier et al. | |
| 2006/0043334 A1 | 3/2006 | Tomi | |
| 2006/0061699 A1 | 3/2006 | Kirsch et al. | |
| 2006/0172089 A1 | 8/2006 | Kawakami | |

(Continued)

FOREIGN PATENT DOCUMENTS

| | | |
|---|---|---|
| DE | 4442842 A1 | 6/1996 |
| DE | 10020061 A1 | 12/2000 |

(Continued)

OTHER PUBLICATIONS

International Search Report dated Jan. 30, 2014 issued in corresponding PCT/EP2013/003195 application (pp. 1-3).

(Continued)

*Primary Examiner* — Geraldina Visconti

(74) *Attorney, Agent, or Firm* — Millen, White, Zelano and Branigan, P.C.

(57) ABSTRACT

The invention relates to an electro-optical liquid-crystal display having a re-alignment layer for re-alignment of the liquid crystals whose field has a component, crucial for the re-alignment, parallel to the liquid-crystal layer, containing a liquid-crystalline medium, characterized in that it comprises one or more compounds of the formula I1 to I3, (I1) (I2) (I3) and at least one compound of the formula II, in which the parameters $R^{11}$, $R^{11*}$, $Z^0$, Sp, k, l, p, $Y^{21}$ to $Y^{22}$, $R^{21}$ and $R^{22}$ have the meanings indicated in claim 1.

10 Claims, No Drawings

(56) References Cited

U.S. PATENT DOCUMENTS

| | | |
|---|---|---|
| 2009/0230355 A1 | 9/2009 | Czanta et al. |
| 2010/0314582 A1 | 12/2010 | Wittek et al. |
| 2011/0024682 A1 | 2/2011 | Czanta et al. |
| 2013/0248762 A1 | 9/2013 | Hirschmann et al. |
| 2013/0256596 A1 | 10/2013 | Hirschmann et al. |
| 2013/0327984 A1 | 12/2013 | Wittek et al. |
| 2014/0061534 A1* | 3/2014 | Goebel .............. C09K 19/3003 252/299.61 |
| 2015/0048276 A1* | 2/2015 | Goebel ................ C09K 19/14 252/299.61 |

FOREIGN PATENT DOCUMENTS

| | | |
|---|---|---|
| DE | 102009005747 A1 | 8/2009 |
| DE | 102011118210 A1 | 5/2012 |
| DE | 102011118786 A1 | 6/2012 |
| EP | 1607463 A1 | 12/2005 |
| EP | 2100944 A1 | 9/2009 |
| JP | 2001-11454 A | 1/2001 |
| JP | 2007-91796 A | 4/2007 |
| JP | 2007-146023 A | 6/2007 |
| WO | 02/46329 A1 | 6/2002 |
| WO | 2004/048501 A1 | 6/2004 |
| WO | 2009/100810 A1 | 8/2009 |
| WO | 2009/103495 A1 | 8/2009 |
| WO | 2009/112153 A1 | 9/2009 |

OTHER PUBLICATIONS

English Translation Abstract of DE 4442842 A1 published Jun. 5, 1996.
English Translation Abstract of JP 2001-011454 A published Jan. 16, 2001.
English Translation Abstract of JP 2007-091796 A published Apr. 12, 2007.
English Translation Abstract of JP 2007-146023 A published Jun. 14, 2007.

* cited by examiner

LIQUID-CRYSTALLINE MEDIUM AND ELECTRO-OPTICAL LIQUID-CRYSTAL DISPLAY

The invention relates to an electro-optical liquid-crystal display having a re-alignment layer for re-alignment of the liquid crystals whose field has a component, crucial for the re-alignment, parallel to the liquid-crystal layer, containing a liquid-crystalline medium, characterised in that it comprises one or more compounds of the formulae I1 to I3,

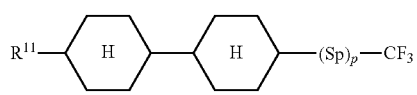

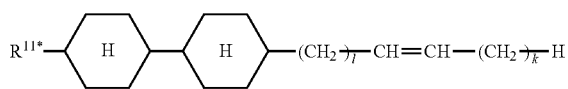

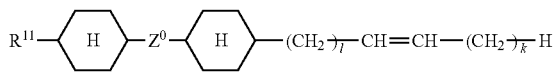

and at least one compound of the formula II,

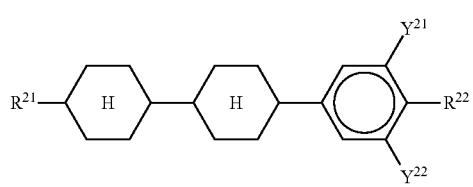

in which the parameters $R^{11}$, $R^{11*}$, $Z^0$, Sp, k, l, p, $Y^{21}$ to $Y^{22}$, $R^{21}$ and $R^{22}$ have the meanings indicated in claim 1.

In conventional liquid-crystal displays (TN, STN, OMI, AMD-TN), the electric fields for re-alignment are generated essentially perpendicular to the liquid-crystal layer.

International Patent Application WO 91/10936 discloses a liquid-crystal display in which the electric signals are generated in such a way that the electric fields have a significant component parallel to the liquid-crystal layer (IPS, in-plane switching). The principles of operating such a display are described, for example, by R. A. Soref in Journal of Applied Physics, Vol. 45, No. 12, pp. 5466-5468 (1974).

EP 0 588 568, for example, discloses various possibilities for the design of the electrodes and for addressing such a display. DE 198 24 137 likewise describes various embodiments of such IPS displays.

Liquid-crystalline materials for IPS displays of this type are described, for example, in DE 195 28 104, EP 2 100 944 A1, WO 2009/112153 A1, WO 2009/100810 A1, WO 2004/048501 A1 and WO 2009/103945 A1.

Typical applications of in-plane switching (IPS) and fringe field switching (FFS) technologies are monitors, notebooks, televisions, mobile telephones, tablet PCs, and many further applications known to the person skilled in the art which are not explicitly enumerated here.

Both the IPS and also the FFS technology have a broad viewing angle compared with other LCD technologies, such as, for example, the vertical alignment (VA) technology.

However, the IPS and FFS technologies known to date have the disadvantage of a limited black state and limited light transmission.

For this reason, the provision of further liquid-crystalline media and the use thereof in a display having high transmission, a good black state and a high contrast ratio is a central challenge for modern IPS and FFS applications. In addition, modern applications also require good low-temperature stability and fast addressing times.

At present, there are different technical concepts for achieving high transmission, a dark black state and/or a high contrast ratio, which are described in detail.

A good black state can be achieved through low light scattering of the liquid-crystalline medium. Suitable media must therefore have relatively high elastic constants and preferably, a suitable Δn taking into account the switching time requirements.

Since these requirements of the liquid-crystalline medium have hitherto been accompanied by an increase in the rotational viscosity and/or greatly reduced low-temperature stability, further liquid-crystalline media are necessary which have a suitable Δn and relatively high elastic constants at the same time as low rotational viscosities and good low-temperature stabilities.

The transmission of an IPS display can be positively influenced by an increased electrode separation in combination with a smaller electrode width. However, an increased electrode separation requires a higher dielectric anisotropy of the medium in order to keep the operating voltage at the same level. However, a high dielectric anisotropy has to date also implied a high rotational viscosity and/or greatly restricted low-temperature stability. In addition, a higher dielectric anisotropy may result in low elastic constants, which reduce the black state and the reaction time. Furthermore, a significant increase in the elastic constants results in an improvement in the black state and in a reduction in the low-temperature stability.

Liquid-crystalline media having high dielectric anisotropy in combination with simultaneously high elastic constants, low rotational viscosity and good low-temperature stabilities are therefore necessary.

A high contrast ratio can be achieved through a good black state and/or high transmission. Both above-mentioned approaches, including the corresponding of the following requirements of the liquid-crystalline medium, are therefore desirable for optimised contrast of the IPS display:
suitable values for Δn and/or
high elastic constants and/or
comparatively high values for dielectric anisotropy,
low values for the rotational viscosity with a view to achieving fast response times, and
good low-temperature stability In the case of FFS displays, the following analogous requirements arise:
suitable values for Δn and/or
high elastic constants and/or
low values for the rotational viscosity with a view to achieving fast response times, and
good low-temperature stability Comparatively high values for dielectric anisotropy are often unnecessary in the case of FFS displays, since an increase in the electrode separation only results in increased transmission to a limited extent here. In general, however, the similar requirements mentioned of a liquid-crystalline medium also apply to FFS displays.

These requirements are surprisingly met, preferably simultaneously, through the use of a liquid-crystalline medium which comprise at least one compound selected from the compounds of the formulae I1 to I3 and at least one compound of the formula II.

The invention therefore relates to a liquid-crystalline medium having positive dielectric anisotropy, where the medium characterised in that it comprises one or more compounds of the formulae I1 to I3,

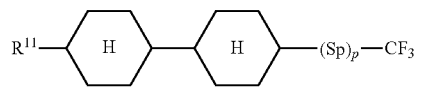
I1

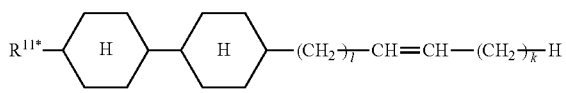
I2

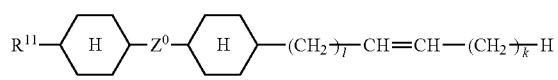
I3 in which
$R^{11}$ denotes an alkyl or alkenyl radical having up to 15 C atoms which is unsubstituted, monosubstituted by CN or $CF_3$, or at least monosubstituted by halogen, where, in addition, one or more $CH_2$ groups in these radicals may be replaced by —O—, —S—,

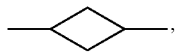,

—C≡C—, —OC—O—, or —COO— in such a way that O atoms are not linked directly to one another, $R^{11*}$ denotes an unsubstituted alkyl or alkenyl radical having up to 15 C atoms, where, in addition, one or more $CH_2$ groups in these radicals may be replaced by —O—, —S—,

,

—C≡C—, —OC—O—, or —COO— in such a way that O atoms are not linked directly to one another, $Z^0$ denotes —COO—, —OCO—, —CH$_2$O—, —OCH$_2$—, —CF$_2$—O—, —O—CF$_2$—, —CH$_2$—CH$_2$—, —CF$_2$—CF$_2$—, —CFH—CFH—, —CH=CH—, —CF=CF—, —CF=CH—, —C≡C— or —CH=CF—, preferably —CH=CH—, —CH$_2$—CH$_2$— or —CF=CF—, Sp denotes O, an alkylene alkyleneoxy, oxaalkylene or alkenylene radical having up to 6 C atoms which is unsubstituted or mono- or polysubstituted by halogen, p denotes 0 or 1, preferably 1, l and k denote 0 to 5, and at least one compound of the formula II,

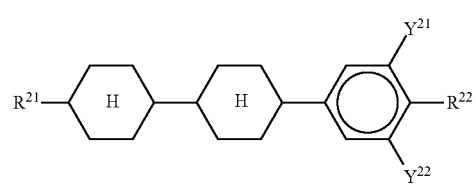
II in which
$R^{21}$ and $R^{22}$ each, independently of one another, denote an alkyl or alkenyl radical having up to 15 C atoms which is unsubstituted, or monosubstituted by CN or $CF_3$, or at least monosubstituted by halogen, where, in addition, one or more $CH_2$ groups in these radicals may be replaced by —O—, —S—,

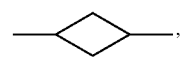,

—C≡C—, —OC—O—, or —O—CO— in such a way that O atoms are not linked directly to one another, and $R^{22}$ also denotes $X^{21}$, $Y^{21}$ and $Y^{22}$ each, independently of one another, denote H or F, preferably both denote F or both denote H, and $X^{21}$ denotes F, Cl, CN, a halogenated alkyl, or alkoxy radical having 1 to 6 C atoms or a halogenated alkenyl radical having 2 to 6 C atoms, preferably F, Cl, CN, $CF_3$, $CHF_2$, $OCF_3$, $OCFHCF_3$, $OCFHCHF_2$, $OCF_2CH_3$, $OCF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or CH=$CF_2$, particularly preferably F, CN, $OCHF_2$ or $OCF_3$.

In a preferred embodiment, the compounds of the formulae I1 to I3 are selected from the compounds of the formulae I1a to I1g, I2a, I2b and/or I3a to I3c,

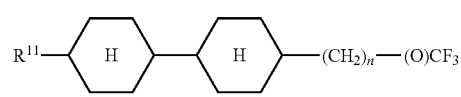
I1a

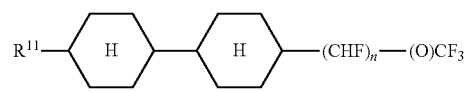
I1b

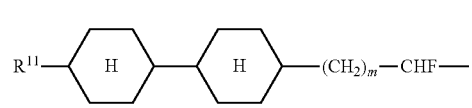
I1c

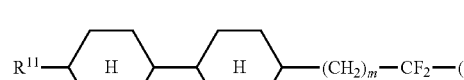
I1d

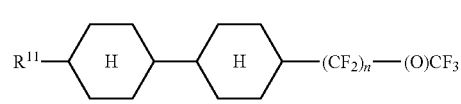
I1e

-continued

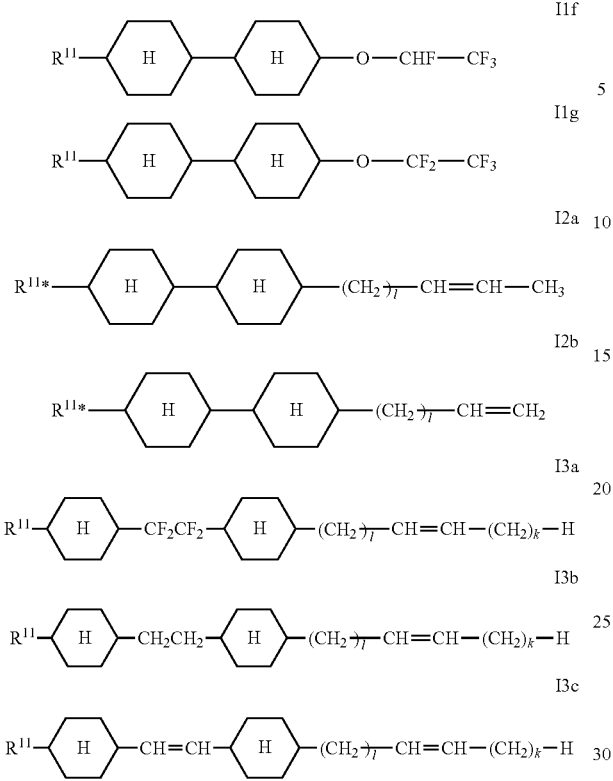

in which
R$^{11}$ has one of the meaning indicated under formula I,
R$^{11*}$ has one of the meaning indicated under formula I,
m denotes 1 to 5, and
k, l, and n denote 0 to 5.

The compounds of the formulae I1 to I3 are especially preferably selected from the compounds of the formulae I1a and I1b where (n) is equal to 0, 1 or 2, and from the compound of the formula I1d and furthermore from the compounds of the formulae I3a to I3c.

The compounds of the formulae I2a, I2b are especially preferably, selected from the compounds of the following sub-formulae,

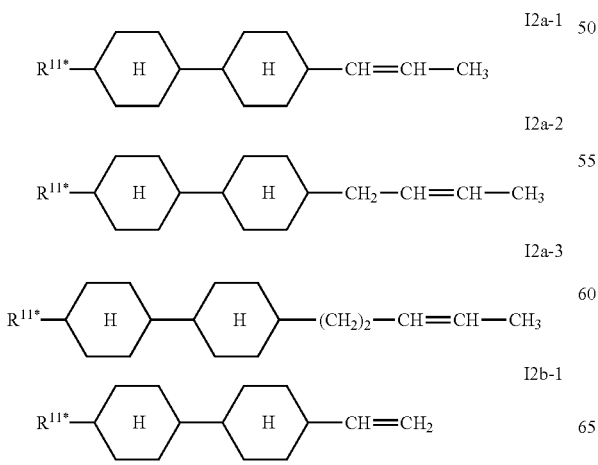

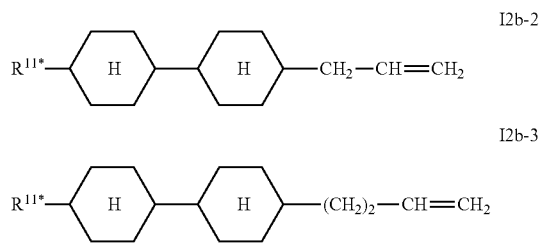

The compounds of the formula II are particularly preferably selected from the compounds of the formulae IIa to IIi,

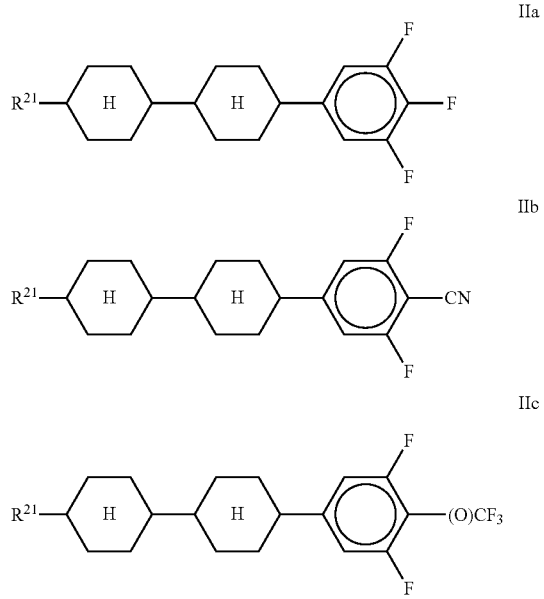

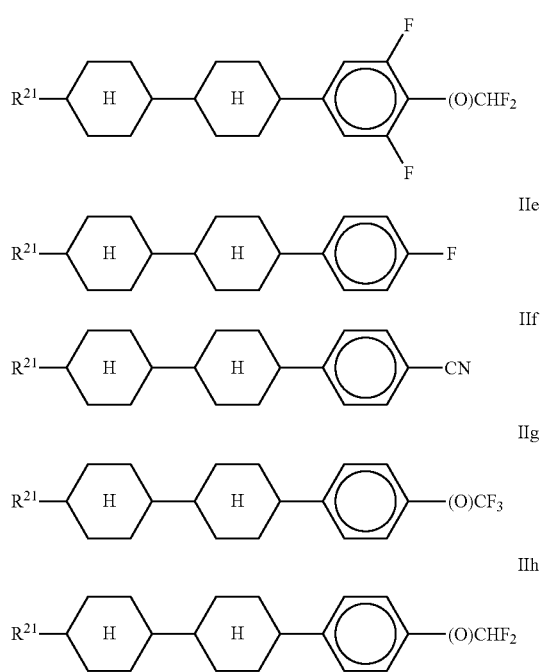

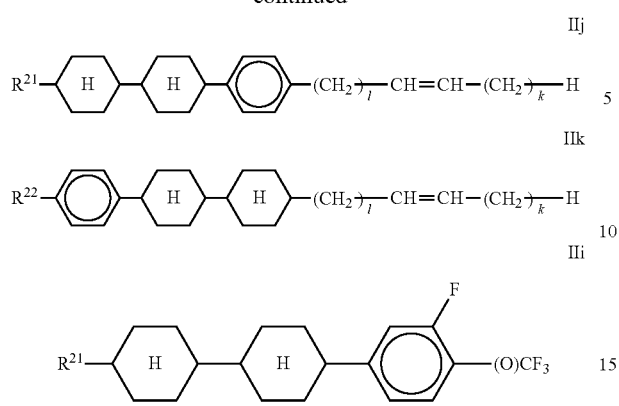

in which $R^{21}$ and $R^{22}$ each, independently of one another, have one of the meaning indicated under formula II and k and l each, independently of one another, denote 0 to 5.

The compounds of the formula II are particularly preferably selected from the compounds of the formulae IId, IIg, IIk and/or IIj where l is equal to 0 and k is equal to 1 or 2.

In a further preferred embodiment, the medium according to the invention comprises at least one compound of the formula III,

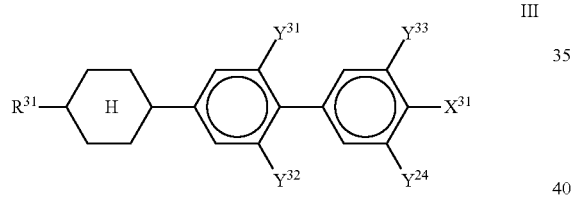

in which $R^{31}$ denotes an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

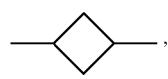

—C≡C—, —OC—O—, or —O—CO— in such a way that O atoms are not linked directly to one another, $X^{31}$ denotes F, Cl, CN, a halogenated alkyl, or alkoxy radical having 1 to 10 C atoms or a halogenated alkenyl radical having 2 to 10 C atoms, $Y^{31}$ and $Y^{32}$ simultaneously denote F, $Y^{33}$ and $Y^{34}$ each, independently of one another, denote H or F.

In a further preferred embodiment, the compounds of the formula III are selected from the compounds of the formulae IIIa to IIIc,

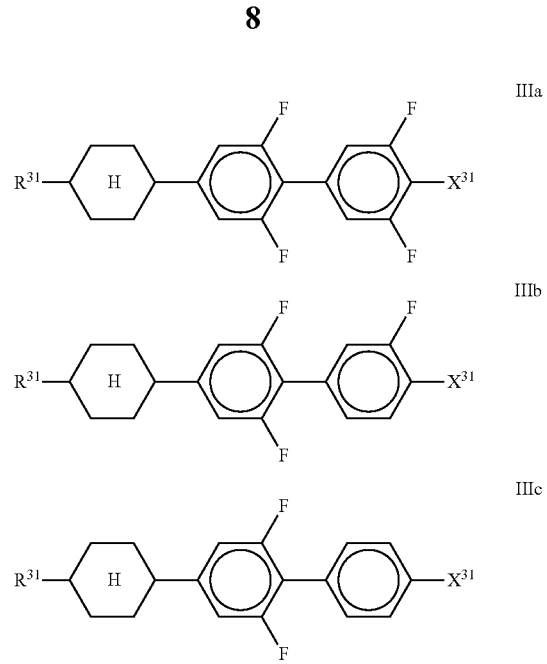

in which $R^{31}$ and $X^{31}$ each have one of the meaning indicated under formula II. Particular preference is given here to compounds of the formula IIIb where $X^{31}$ is equal to F.

In a further preferred embodiment, the medium according to the invention comprises at least one compound of the formula IV,

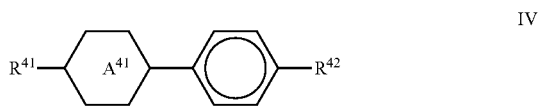

in which $R^{41}$ denotes an alkyl, or alkoxy radical having 1 to 10 C atoms or an alkenyl radical having 2 to 10 C atoms, $R^{42}$ has one of the meanings of $R^{41}$ or denotes $X^{41}$, $A^{41}$ denotes

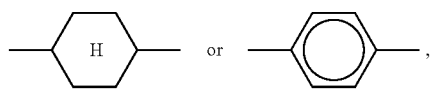

$X^{41}$ denotes F, Cl, CN, a halogenated alkyl, or alkoxy radical having 1 to 6 C atoms or a halogenated alkenyl radical having 2 to 6 C atoms, preferably F, Cl, CN, $CF_3$, $CHF_2$, $OCF_3$, $OCFHCF_3$, $OCFHCHF_2$, $OCF_2CH_3$, $OCF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or $CH=CF_2$, very particularly preferably F, Cl, CN, $OCHF_2$ or $OCF_3$, especially preferably F or Cl.

In a further preferred embodiment, the medium according to the invention comprises at least one compound of the formula V,

V

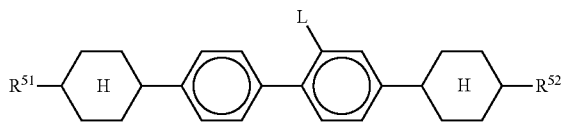

in which
R$^{51}$ and R$^{52}$ each, independently of one another, denote an alkyl or alkoxy radical having 1 to 10 C atoms, an alkenyl radical having 2 to 10 C atoms and
L denotes H or F, preferably F.

In a further embodiment, the medium according to the invention comprises at least one of the compounds of the formula VI,

VI

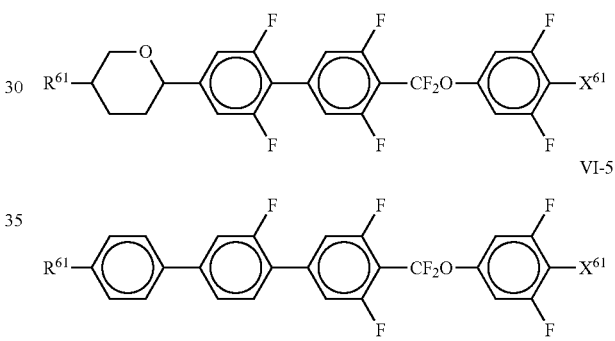

in which
R$^{61}$ denotes an unsubstituted alkyl radical having 1 to 15 C atoms, where, in addition, one or more CH$_2$ groups in this radical may each be replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another, preferably a straight-chain alkyl radical having 2 to 7 C atoms,
A$^{61}$, A$^{62}$ each, independently of one another, denote

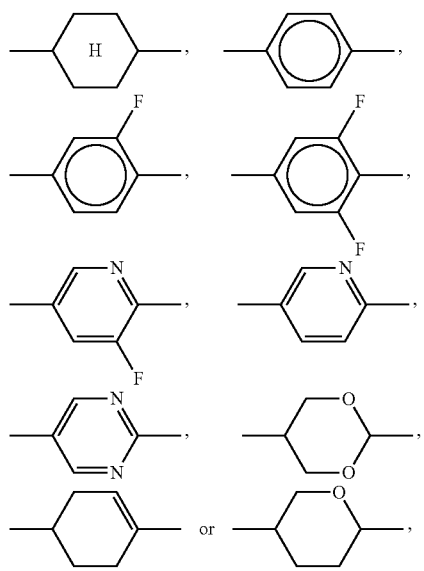

and
X$^{61}$ denotes F, Cl, CN, or alkyl, alkenyl, alkenyloxy, alkylalkoxy or alkoxy having 1 to 3 C atoms which is mono- or polysubstituted by F, preferably denotes F, CF$_3$ or OCF$_3$.

The compounds of the formula VI are particularly preferably selected from the sub-formulae VI-1 to VI-5,

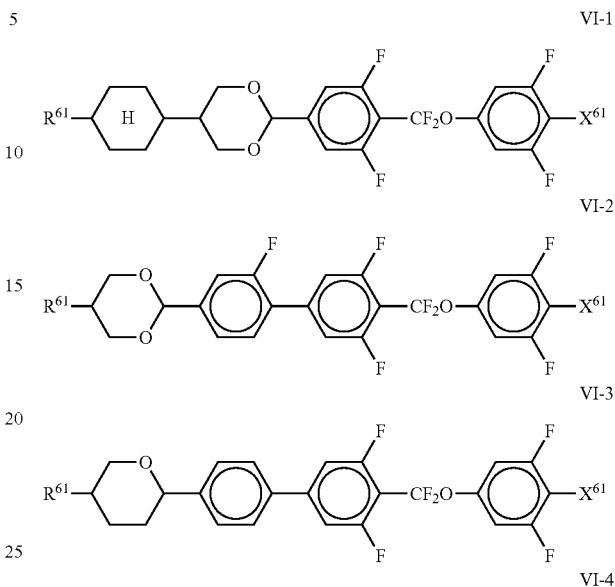

in which R$^{61}$ and X$^{61}$ each have one of the meaning indicated under formula II.

The compounds of the formula VI are especially preferably selected here from the sub-formulae VI-1 to VI-5 where X$^{61}$ is equal to F or CF$_3$ or OCF$_3$.

In a further preferred embodiment, the medium according to the invention comprises at least one compounds of the formula VII,

VII

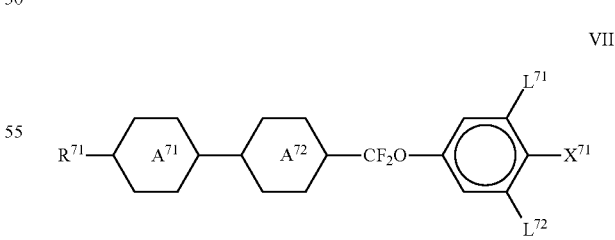

in which
R$^{71}$ denotes an unsubstituted alkyl radical having 1 to 15 C atoms, where, in addition, one or more CH$_2$ groups in this radical may each be replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another, preferably a straight-chain alkyl radical having 2 to 7 C atoms, $A^{71}$, $A^{72}$ each, independently of one another, denote

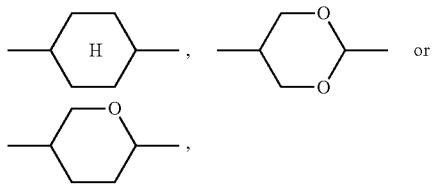

$L^{71}$ and $L^{72}$ each, independently of one another, denote H or F, preferably both denote F, and $X^{71}$ denotes F, Cl, CN, or alkyl, alkenyl, alkenyloxy, alkylalkoxy or alkoxy having 1 to 3 C atoms, which is mono- or polysubstituted by F, preferably denotes F, $CF_3$ or $OCF_3$.

The compounds of the formula VII are particularly preferably selected from the sub-formulae VII-1 to VII-5,

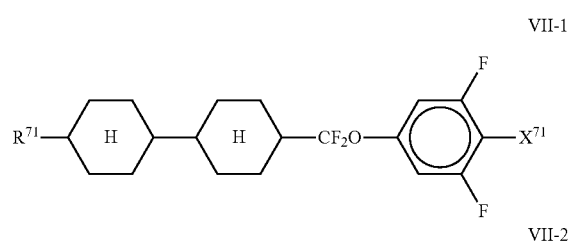

VII-1

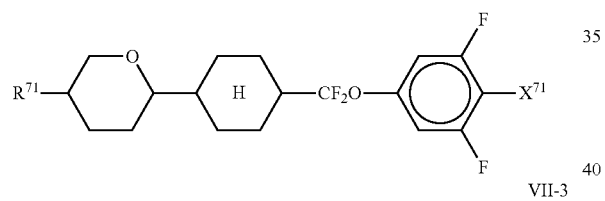

VII-2

VII-3

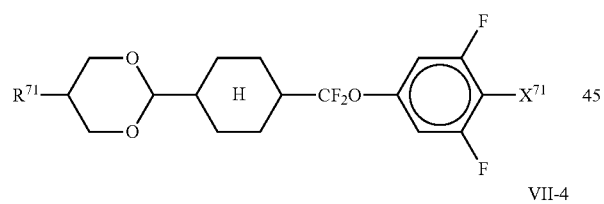

VII-4

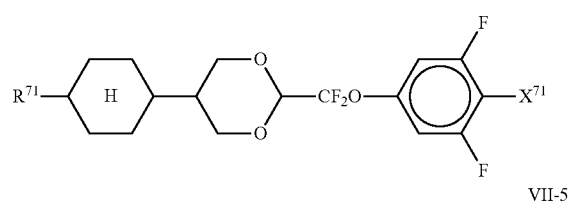

VII-5

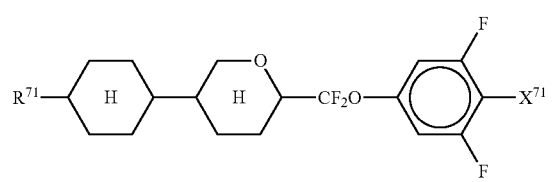

in which $R^{71}$ and $X^{71}$ each have one of the meaning indicated under formula VII.

Particular preference is given to the compounds of the sub-formulae VII-1 to VII-5 where $X^{71}$ is equal to F.

In a further embodiment, the medium according to the invention comprises at least one compound of the formula VIII,

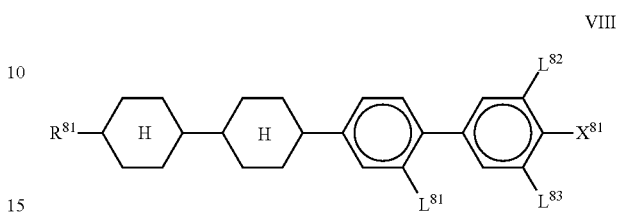

VIII in which $R^{81}$ denotes an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—, —C≡C—, —CH=CH—, —OC—O— or —O—CO— in such a way that O atoms are not linked directly to one another, $L^{81}$ to $L^{83}$, independently of one another, identically or differently, denote H or F, and $X^{81}$ denotes F, Cl, halogenated alkyl or alkoxy radical having 1 to 7 C atoms or halogenated alkenyl radical having 2 to 7 C atoms.

Particularly preferred compounds of the formula VIII are the compound of the following sub-formulae VIII-1 and VIII-2,

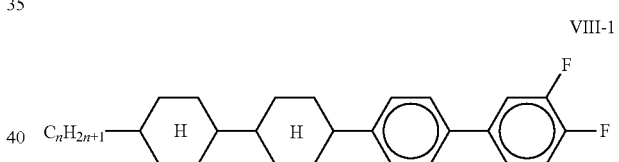

VIII-1

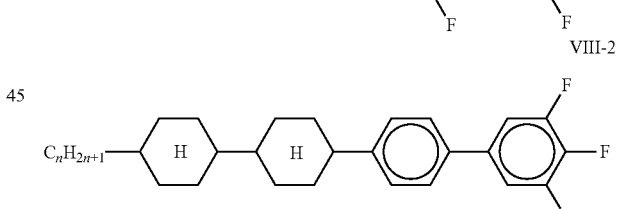

VIII-2 in which n=1 to 7.

If $R^{11-81}$ or $R^{11*}$ in the above formulae denotes an alkyl radical and/or an alkoxy radical, this may be straight-chain or branched. It is preferably straight-chain, has 1, 2, 3, 4, 5, 6 or 7 C atoms and accordingly preferably denotes methyl, ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradedoxy.

If $R^{11-81}$ or $R^{11*}$ denotes an alkenyl radical, the expression "alkenyl" encompasses straight-chain and branched alkenyl groups having 2-7 carbon atoms, in particular the straight-chain groups. Preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

If $R^{11-81}$ denotes an alkyl or alkenyl radical which is at least monosubstituted by halogen, this radical is preferably straight-chain and halogen is preferably F or Cl. In the case of polysubstitution, halogen is preferably F. The resultant radicals also include perfluorinated radicals. In the case of monosubstitution, the fluorine or chlorine substituent can be in any desired position, but is preferably in the ω-position.

In the pure state, the compounds of the formula I to VIII are colourless and form liquid-crystalline mesophases in a temperature range which is favourably located for electro-optical use. They are stable chemically, thermally and to light.

The individual compounds of the above-mentioned formulae and their sub-formulae which can be used in the media according to the invention are either known, or they are prepared by methods known per se, as described in the literature (for example in the standard works, such as Houben-Weyl, Methoden der Organischen Chemie [Methods of Organic Chemistry], Georg-Thieme-Verlag, Stuttgart), to be precise under reaction conditions which are known and suitable for the said reactions. Use can also be made here of variants known per se which are not mentioned here in greater detail.

The optimum mixing ratio of the compounds of the above-mentioned formulae depends substantially on the desired properties, on the choice of the components of the above-mentioned formulae and on the choice of other components optionally present.

Suitable mixing ratios within the range indicated above can easily be determined from case to case.

The total amount of compounds of the above-mentioned formulae in the mixtures according to the invention is not crucial. The mixtures may therefore comprise one or more further components in order to optimise various properties. However, the observed effect on the desired improvement of the properties of the mixture is generally greater, the higher the total concentration of compounds of the above-mentioned formulae.

Further preferred embodiments are indicated below:

The medium comprises one or more compounds of the formula I1 and/or I2 and/or I3 with a proportion of compounds of the formulae I1 and/or I2 and/or I3 in the mixture as a whole between 1-80% by weight, preferably 2-75% by weight, particularly preferably 3-70% by weight and one or more compounds of the formula II, or The medium comprises at least two compounds selected from the formulae I1 to I3, where one of the compounds is preferably selected from the compounds of the formula I2a-1 with a proportion of compounds of the formulae I2a-1 in the mixture as a whole between 1-60% by weight, preferably 2-50% by weight, particularly preferably 5-40% by weight and at least one compound of the formula II, or The medium comprises, besides two compounds of the formula I2 preferably selected from the formulae I2a-1 and I2b-1 with a proportion of compounds of the formulae I2a-1 in the mixture as a whole between 1-60% by weight, preferably 2-50% by weight, particularly preferably 5-40% by weight and with a proportion of compounds of the formulae I2b-1 in the mixture as a whole between 1-80% by weight, preferably 2-75% by weight, particularly preferably 5-70% by weight, and at least one compound of the formula II, or The medium comprises, besides three compounds of the formula I2, preferably selected from the compounds of the formulae I2a-1, I2b-1 and I2b-3 with a proportion of compounds of the formulae I2a-1 in the mixture as a whole between 1-60% by weight, preferably 2-50% by weight, particularly preferably 5-40% by weight, and with a proportion of compounds of the formulae I2b-1 in the mixture as a whole between 1-80% by weight, preferably 2-75% by weight, particularly preferably 5-70% by weight, furthermore with a proportion of compounds of the formulae I2b-3 in the mixture as a whole between 1-70% by weight, preferably 2-60% by weight, particularly preferably 5-50% by weight, and at least one compound of the formula II.

The above-mentioned mixture concepts preferably comprise optionally one, two, three or more compounds of the formula III, preferably selected from the compounds of the formula IIIb, where the proportion of compounds of the formulae III in the mixture as a whole is up to 55% by weight, preferably up to 40% by weight, particularly preferably up to 30% by weight, and/or optionally one, two, three or more compounds of the formula IV, preferably selected from the compounds of the formula IV in which $X^{41}$ denotes fluorine, where the proportion of compounds of the formulae IV in the mixture as a whole is up to 40% by weight, preferably up to 30% by weight, and/or optionally one, two, three or more compounds of the formula V, where the proportion of compounds of the formulae V in the mixture as a whole is up to 40% by weight, preferably up to 30% by weight, particularly preferably up to 25% by weight, and/or optionally one, two, three or more compounds of the formula VI, with a proportion of compounds of the formulae VI in the mixture as a whole up to 80% by weight, preferably up to 75% by weight, particularly preferably up to 70% by weight, and/or optionally one, two, three or more compounds of the formula VII with a proportion of compounds of the formulae VII in the mixture as a whole up to 50% by weight, preferably up to 40% by weight, particularly preferably up to 30% by weight, and/or optionally one, two, three or more compounds of the formula VIII with a proportion of compounds of the formulae VIII in the mixture as a whole up to 50% by weight, preferably up to 40% by weight, particularly preferably up to 30% by weight, and where The proportion of one, two, three or more compounds of the formula II, preferably selected from the compounds of the formula IId and/or IIg and/or IIj and/or IIk, in the mixture as a whole is preferably 1-80% by weight, particularly preferably 2-70% by weight, very particularly preferably 3-60% by weight.

In a further preferred embodiment, the medium comprises at least two, compounds of the formula I2, at least one compound of the formula II and at least one compound of the formula VI.

In a further preferred embodiment, the medium preferably comprises three compounds of the formula I2, at least one compound of the formula II and at least one compound of the formula VI.

It has been found that even a relatively low proportion of compounds of the formulae I1 to I3 mixed with conventional liquid-crystal materials results in a significant increase in the elastic constants, where at the same time low values for the rotational viscosity with a view to achieving fast response times, and relatively high values for dielectric anisotropy are observed. At the same time, the mixtures exhibit very good low-temperature stability.

The invention also relates to electro-optical displays, such as, for example, STN or MLC displays, having two plane-parallel outer plates, which, with a frame, form a cell, integrated non-linear elements for switching individual pixels on the outer plates, and a nematic liquid-crystal mixture having positive dielectric anisotropy and high specific resistance which is located in the cell), which comprise media of this type and to the use of these media for electro-optical purposes.

The liquid-crystal mixtures according to the invention facilitate an important broadening of the available parameter latitude. The achievable combinations of high elastic constants, low rotational viscosity and relatively high dielectric anisotropy far exceed previous materials from the prior art.

The mixtures according to the invention are particularly suitable for mobile applications and low-$\Delta$n TFT applications, such as, for example, mobile telephones and PDAs.

The liquid-crystal mixtures according to the invention simultaneously enable dielectric anisotropy values $\Delta\varepsilon \geq +3$, preferably $\geq +7$ and a high value for the specific resistance to be achieved while retaining the nematic phase down to $-20°$ C. and preferably down to $-30°$ C., particularly preferably down to $-40°$ C., and the clearing point $\geq 80°$ C., preferably $\geq 90°$ C., particularly preferably $\geq 100°$ C., enabling excellent MLC displays to be achieved. In particular, the mixtures are characterised by low operating voltages.

The threshold voltage of the liquid-crystal mixtures according to the invention is preferably $\leq 2.0$ V, particularly preferably $\leq 1.8$ V.

The birefringence $\Delta$n of the liquid-crystal mixtures according to the invention is preferably $\leq 0.14$, particularly preferably $\leq 0.13$, especially preferably $\leq 0.12$.

The rotational viscosity $\gamma_1$ of the liquid-crystal mixtures according to the invention at 20° C. is preferably $\leq 150$ mPa·s, preferably $\leq 120$ mPa·s, particularly preferably $\leq 100$ mPa·s.

The nematic phase range of the liquid-crystal mixtures according to the invention preferably has a width of at least 90°, in particular at least 100°. This range preferably extends at least from $-40°$ to $+110°$ C.

In view of the advantageous, high elastic constants of the medium according to the invention, the corresponding characteristic number is determined by the values of $K_{ave}$.

$K_{ave}$ is calculated by $$K_{ave}=(K_{11}+K_{22}+K_{33})/3$$

where $K_{22}$ can be approximated by $$K_{22} \approx K_{11}/2.$$

The values of $K_{ave}$ of the liquid-crystal mixtures according to the invention are preferably $\geq 10$ pN, particularly preferably $\geq 12$ pN, in particular $\geq 13$ pN.

It goes without saying that a suitable choice of the components of the mixtures according to the invention also enables higher clearing points (for example above 100° C.) to be achieved at higher threshold voltages or lower clearing points to be achieved at lower threshold voltages while retaining the other advantageous properties. Likewise, mixtures having greater $\Delta\varepsilon$ and thus low thresholds can be obtained at correspondingly less-increased viscosities. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German Patent 30 22 818) with the same threshold voltage as in an analogous display at the second minimum, a lower dielectric anisotropy is adequate here. This enables significantly higher specific resistances to be achieved using the mixtures according to the invention at the first minimum than in the case of mixtures comprising cyano compounds. The person skilled in the art will be able to set the birefringence necessary for a pre-specified layer thickness of the MLC display using simple routine methods through a suitable choice of the individual components and their proportions by weight.

Also in accordance with the invention is an electro-optical display having a re-alignment layer for re-alignment of the liquid crystals whose field has a component, crucial for the re-alignment, parallel to the liquid-crystal layer, which contains, as dielectric, a liquid-crystalline medium according to the invention.

The construction of the MLC display according to the invention from polarisers, electrode base plates and electrodes having surface treatment corresponds to the conventional design for displays of this type. The term conventional design is broadly drawn here and also encompasses all derivatives and modifications of the MLC display, in particular also matrix display elements based on poly-Si TFT or MIM.

However, an essential difference of the displays according to the invention from those conventional to date based on the twisted nematic cell consists in the choice of the liquid-crystal parameters of the liquid-crystal layer.

The liquid-crystal mixtures which can be used in accordance with the invention are prepared in a manner conventional per se, for example by mixing one or more compounds of the formula I1 to I3 with one or more compounds of the formulae II to V or with further liquid-crystalline compounds and/or additives. In general, the desired amount of the components used in smaller amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

In the present application and in the following examples, the structures of the liquid-crystal compounds are indicated by means of acronyms, where the transformation into chemical formulae takes place in accordance with Table A. All radicals $C_nH_{2n+1}$ and $C_mH_{2m+1}$ are straight-chain alkyl radicals having n and m C atoms respectively; n, m and k are integers and preferably denote 0, 1, 2, 3, 4, 5, 6, 7, 8, 9, 10, 11 or 12. The coding in Table B is self-evident. In Table A, only the acronym for the basic structure is indicated. In individual cases, the acronym for the basic structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nOCF$_3$ | $C_nH_{2n+1}$ | OCF$_3$ | H | H |
| nOCF$_3$.F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components can be found in Tables A and B.

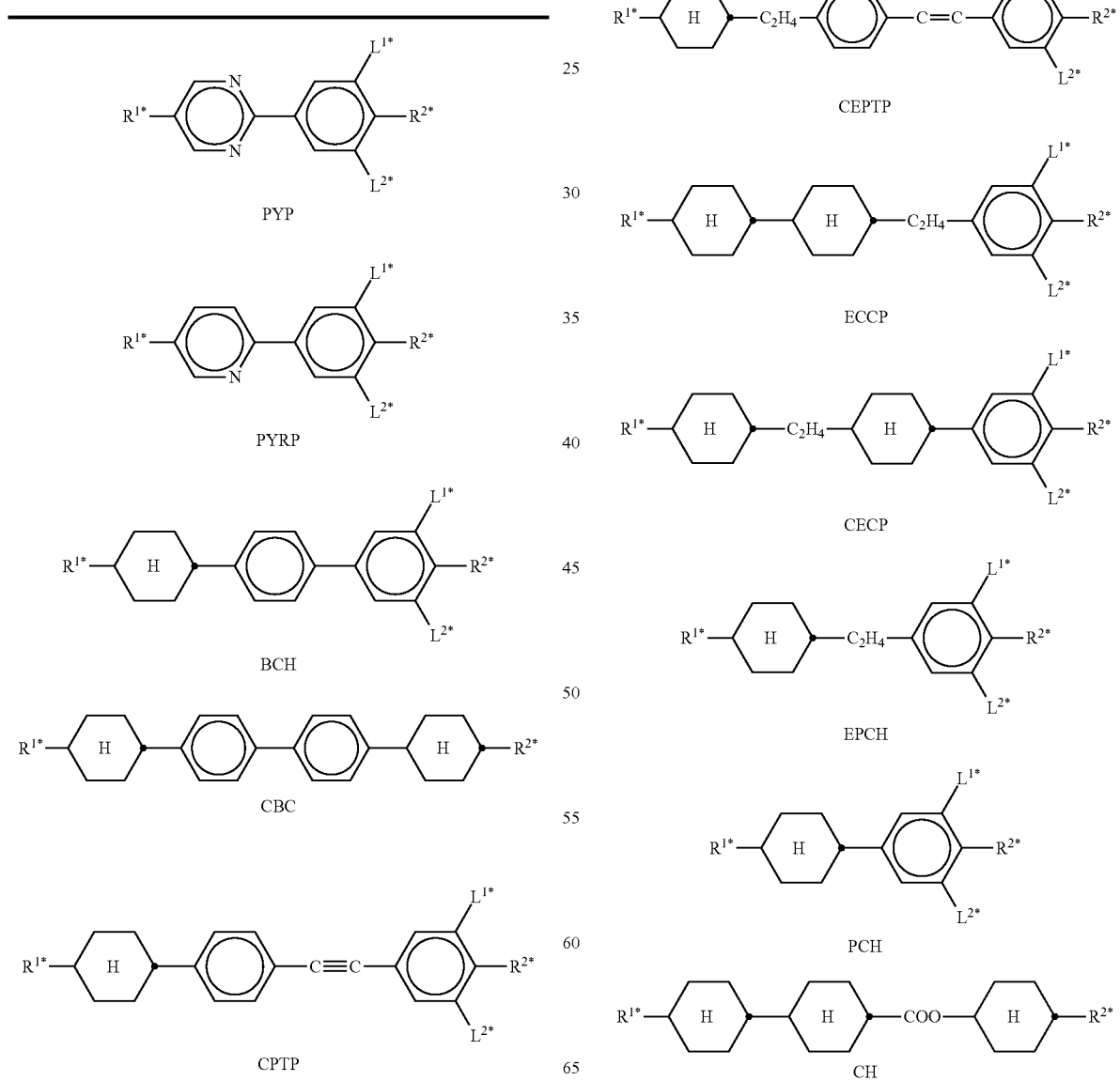

TABLE A

PYP

PYRP

BCH

CBC

CPTP

TABLE A-continued

CEPTP

ECCP

CECP

EPCH

PCH

CH

TABLE A-continued
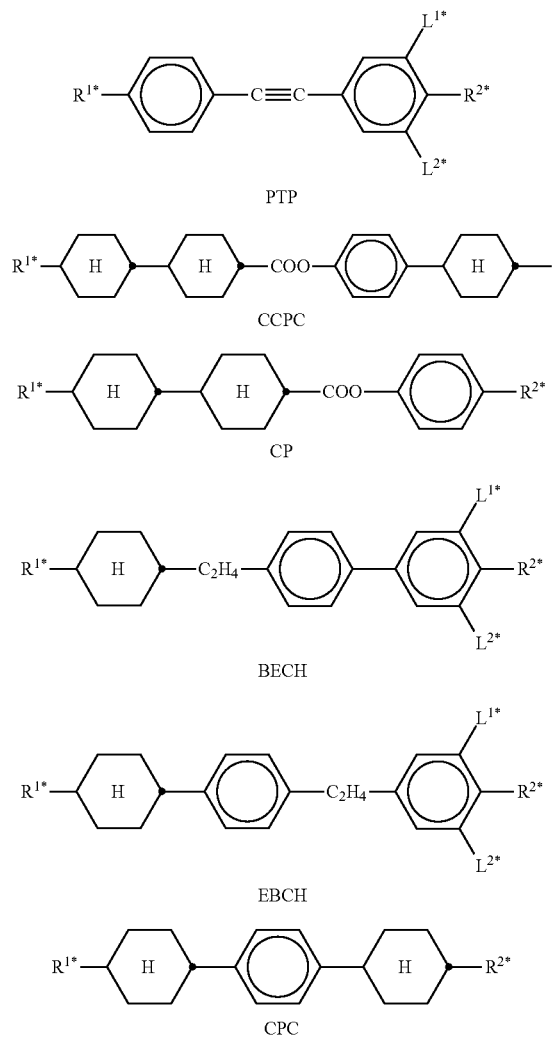
TABLE A-continued
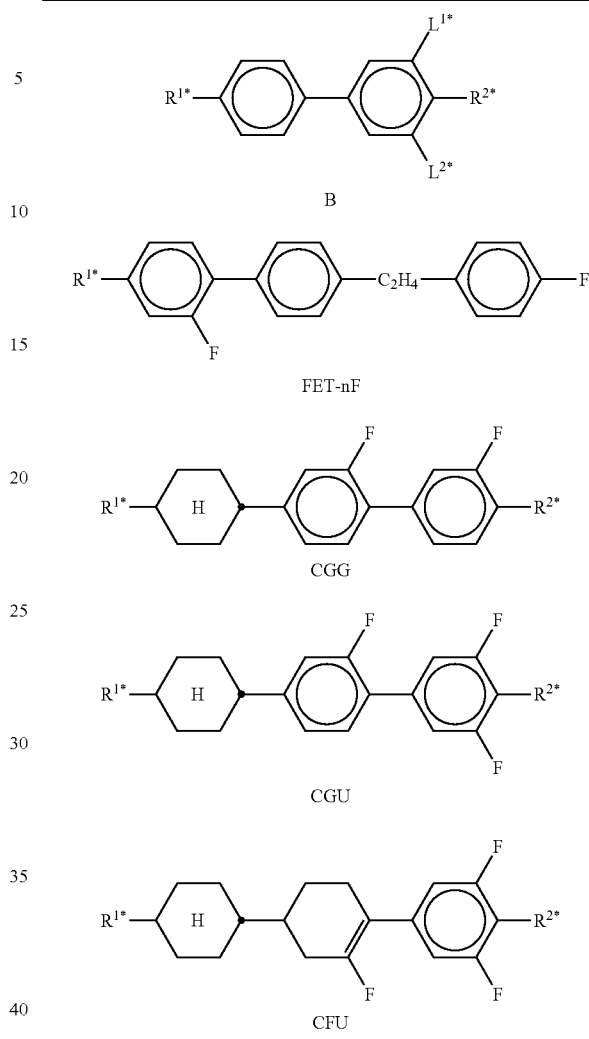
TABLE B
Particular preference is given to liquid-crystalline mixtures which, besides the compounds of the formulae I1 to I3 and the compounds of the formula II, comprise at least one, two, three, four or more compounds from Table B.
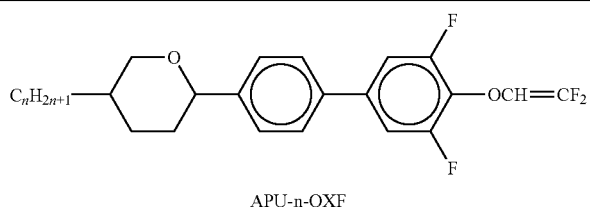
APU-n-OXF
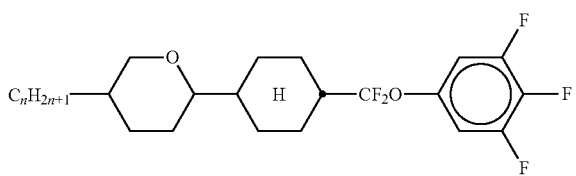
ACQU-n-F TABLE B-continued
Particular preference is given to liquid-crystalline mixtures which, besides the compounds of the formulae I1 to I3 and the compounds of the formula II, comprise at least one, two, three, four or more compounds from Table B.
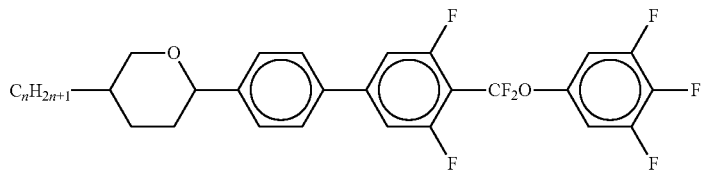
APUQU-n-F
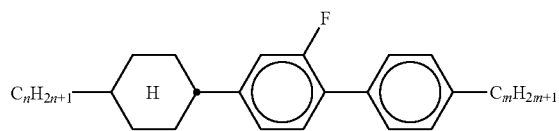
BCH-n.Fm
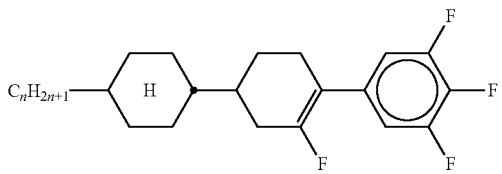
CFU-n-F
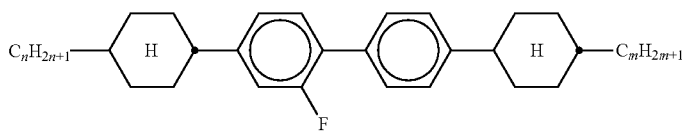
CBC-nmF
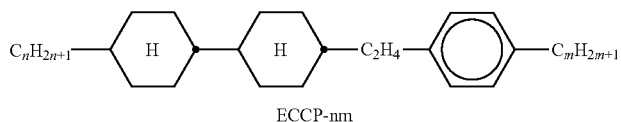
ECCP-nm
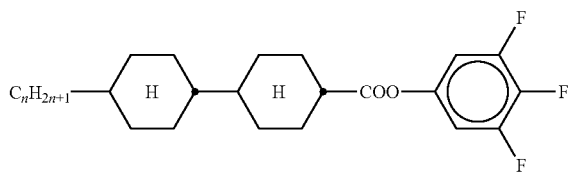
CCZU-n-F
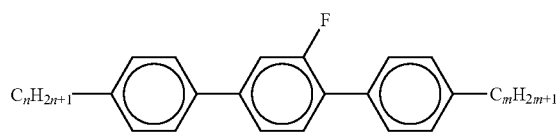
PGP-n-m
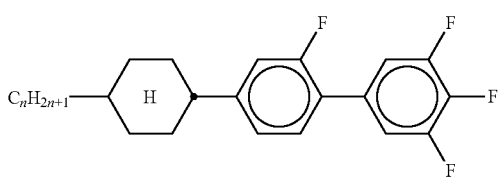
CGU-n-F TABLE B-continued
Particular preference is given to liquid-crystalline mixtures which, besides the compounds of the formulae I1 to I3 and the compounds of the formula II, comprise at least one, two, three, four or more compounds from Table B.
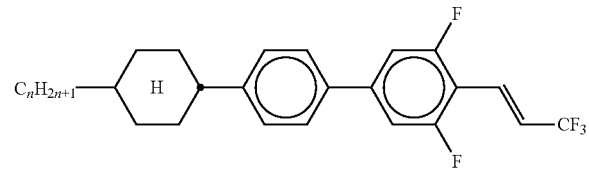
CPU-n-VT
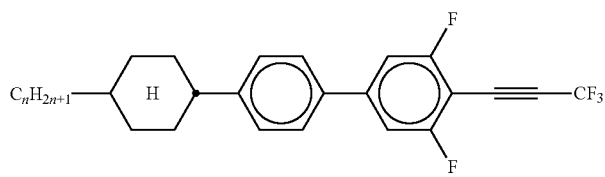
CPU-n-AT
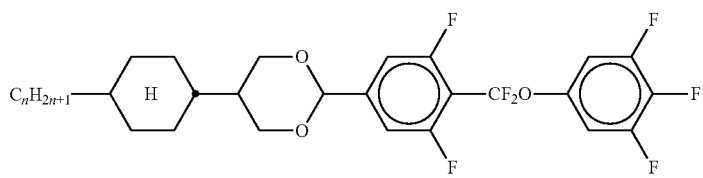
CDUQU-n-F
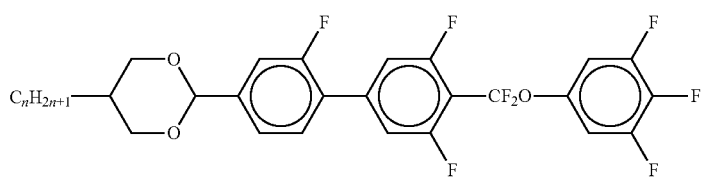
DGUQU-n-F
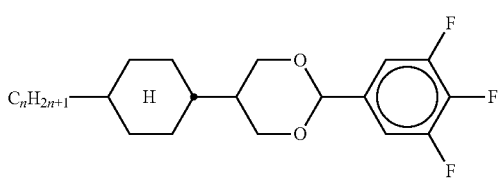
CDU-n-F
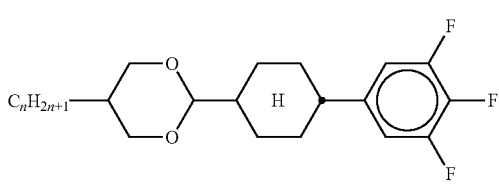
DCU-n-F
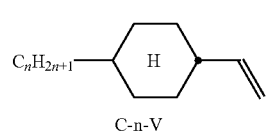
C-n-V TABLE B-continued
Particular preference is given to liquid-crystalline mixtures which, besides the compounds of the formulae I1 to I3 and the compounds of the formula II, comprise at least one, two, three, four or more compounds from Table B.
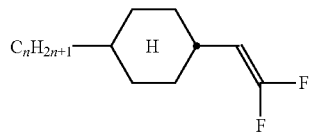
C-n-XF
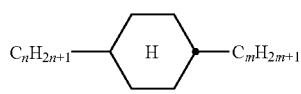
C-n-m
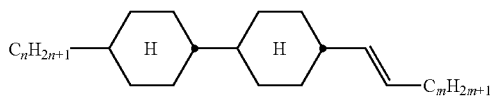
CC-n-Vm
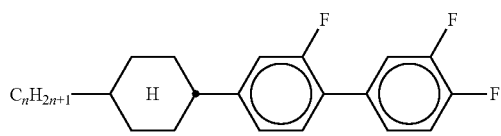
CGG-n-F
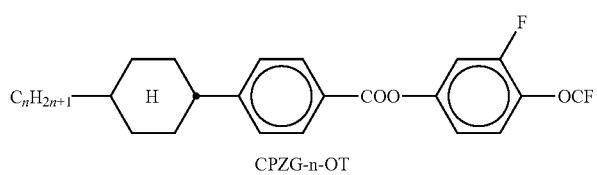
CPZG-n-OT
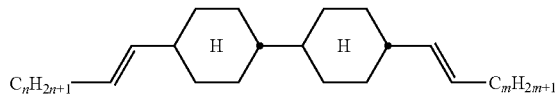
CC-nV-Vm
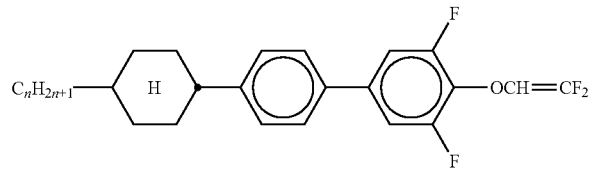
CPU-n-OXF
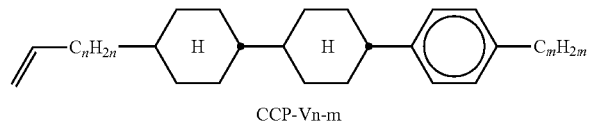
CCP-Vn-m
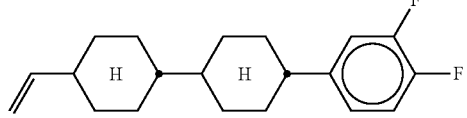
CCG-V-F TABLE B-continued
Particular preference is given to liquid-crystalline mixtures which, besides the compounds of the formulae I1 to I3 and the compounds of the formula II, comprise at least one, two, three, four or more compounds from Table B.
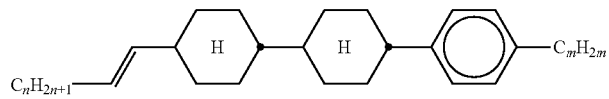
CCP-nV-m
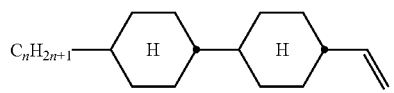
CC-n-V
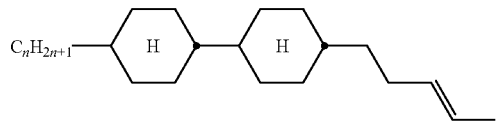
CC-n-2V1
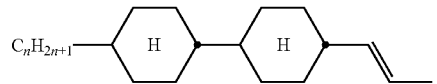
CC-n-V1
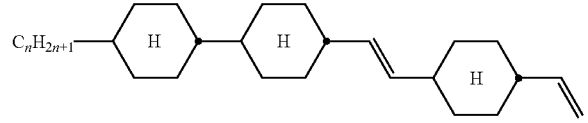
CCVC-n-V
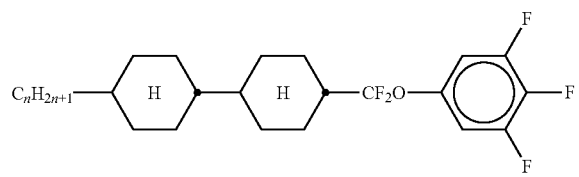
CCQU-n-F
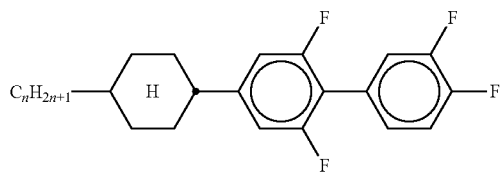
CUP-nF.F
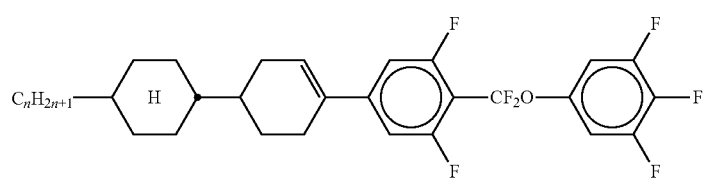
CLUQU-n-F TABLE B-continued
Particular preference is given to liquid-crystalline mixtures which, besides the compounds of the formulae I1 to I3 and the compounds of the formula II, comprise at least one, two, three, four or more compounds from Table B.
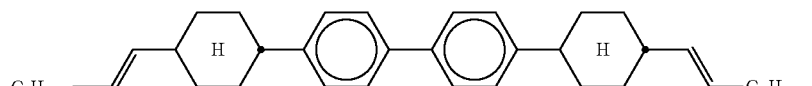
CPPC-nV-Vm
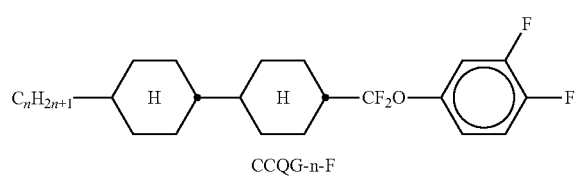
CCQG-n-F
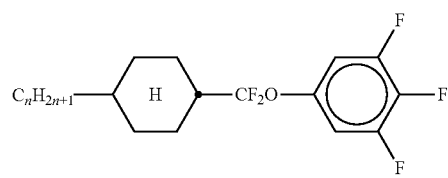
CQU-n-F
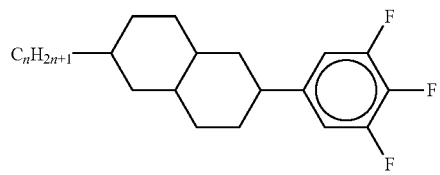
Dec-U-n-F
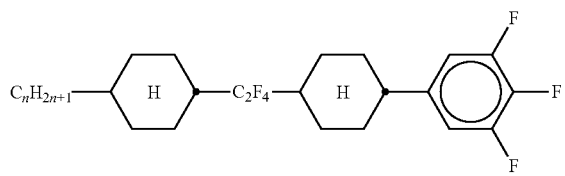
CWCU-n-F
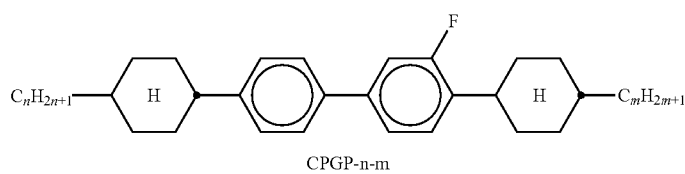
CPGP-n-m
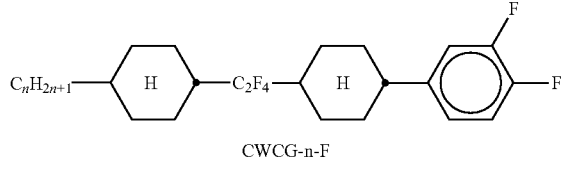
CWCG-n-F
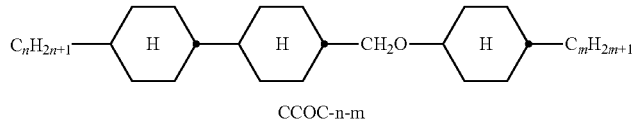
CCOC-n-m TABLE B-continued
Particular preference is given to liquid-crystalline mixtures which, besides the compounds of the formulae I1 to I3 and the compounds of the formula II, comprise at least one, two, three, four or more compounds from Table B.
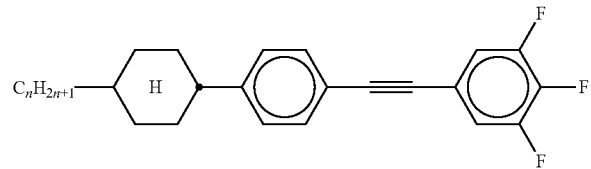
CPTU-n-F
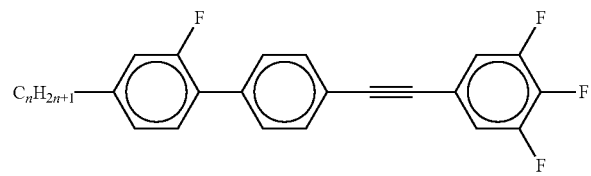
GPTU-n-F
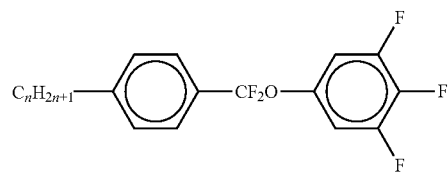
PQU-n-F
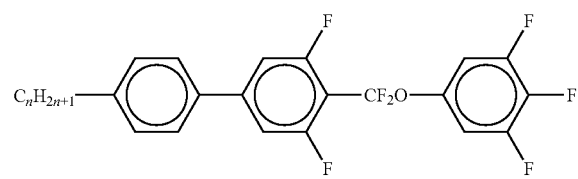
PUQU-n-F
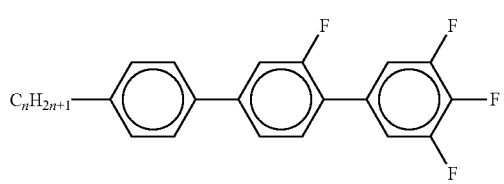
PGU-n-F
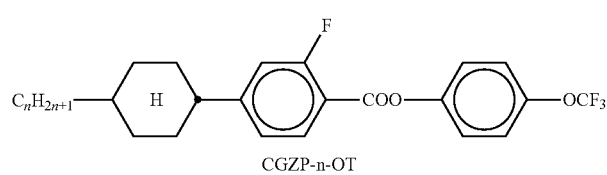
CGZP-n-OT
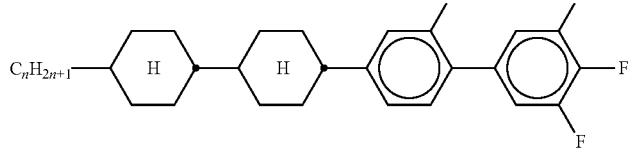
CCGU-n-F TABLE B-continued
Particular preference is given to liquid-crystalline mixtures which, besides the compounds of the formulae I1 to I3 and the compounds of the formula II, comprise at least one, two, three, four or more compounds from Table B.
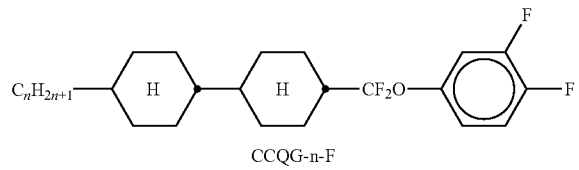
CCQG-n-F
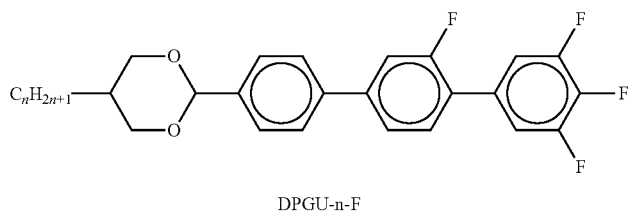
DPGU-n-F
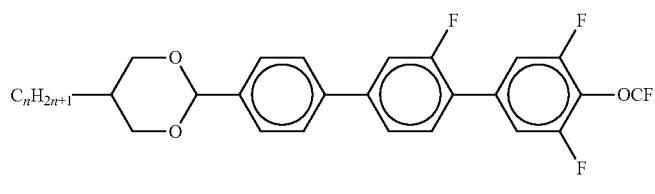
DPGU-n-OT
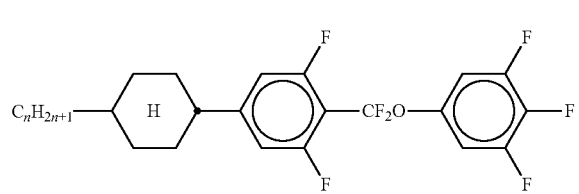
CUQU-n-F
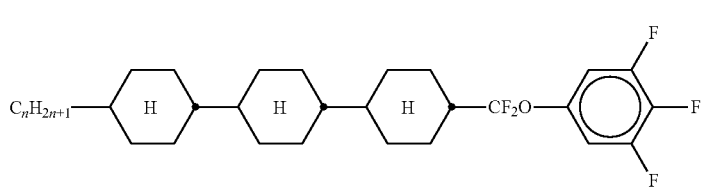
CCCQU-n-F
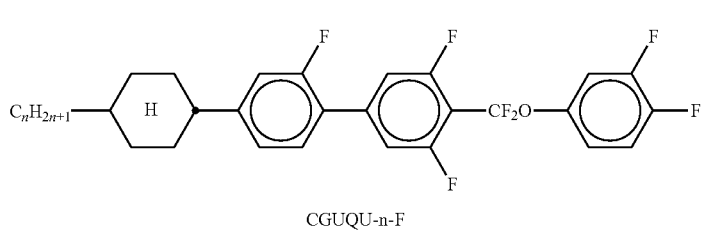
CGUQU-n-F
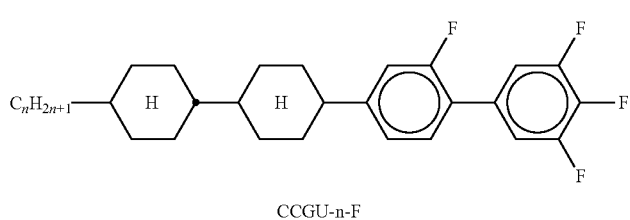
CCGU-n-F TABLE B-continued
Particular preference is given to liquid-crystalline mixtures which, besides the compounds of the formulae I1 to I3 and the compounds of the formula II, comprise at least one, two, three, four or more compounds from Table B.
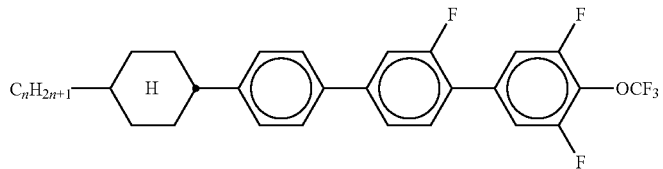
CPGU-n-OT
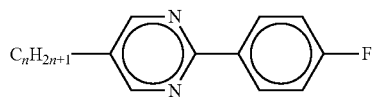
PYP-nF
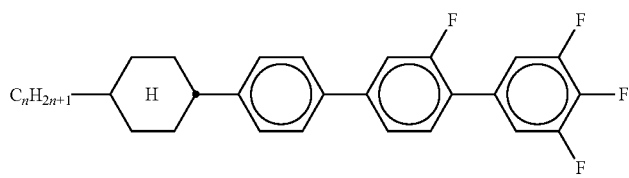
CPGU-n-F
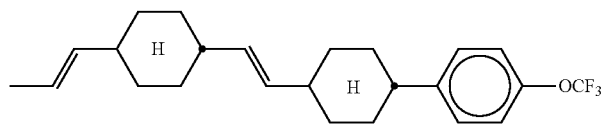
CVCP-1V-OT
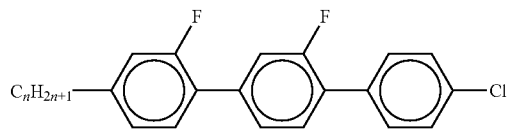
GGP-n-Cl
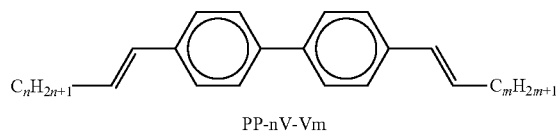
PP-nV-Vm
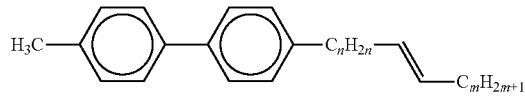
PP-1-nVm
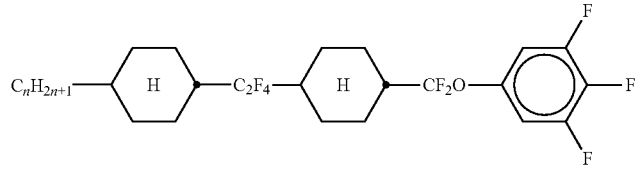
CWCQU-n-F TABLE B-continued
Particular preference is given to liquid-crystalline mixtures which, besides the compounds of the formulae I1 to I3 and the compounds of the formula II, comprise at least one, two, three, four or more compounds from Table B.
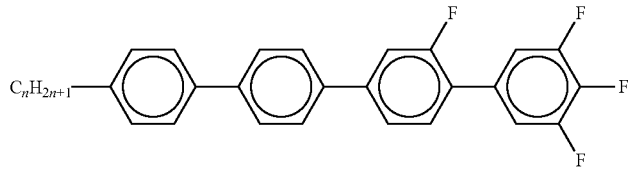
PPGU-n-F
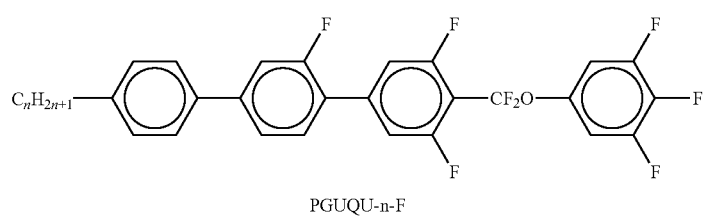
PGUQU-n-F
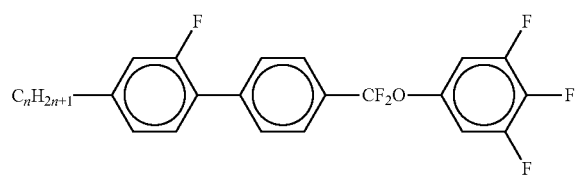
GPQU-n-F
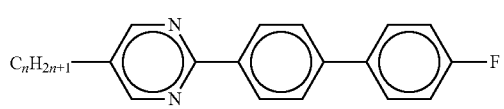
MPP-n-F
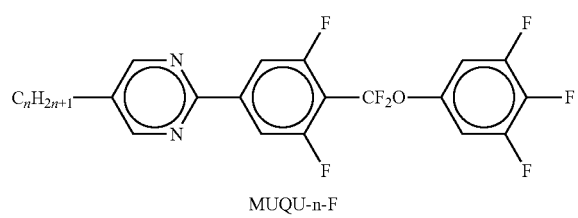
MUQU-n-F
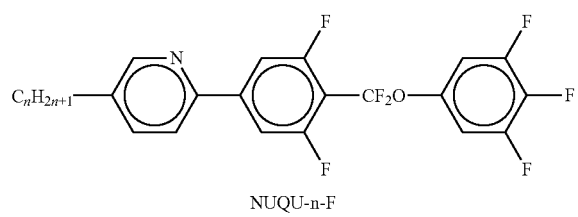
NUQU-n-F
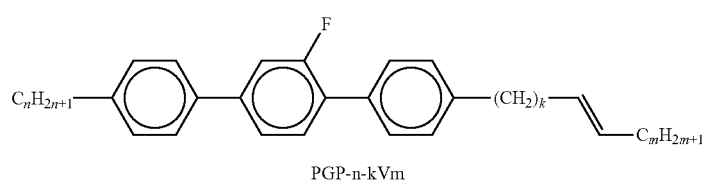
PGP-n-kVm
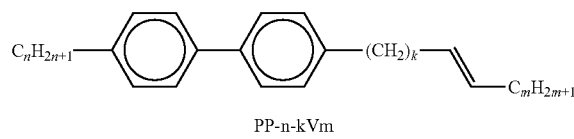
PP-n-kVm TABLE B-continued Particular preference is given to liquid-crystalline mixtures which, besides the compounds of the formulae I1 to I3 and the compounds of the formula II, comprise at least one, two, three, four or more compounds from Table B.

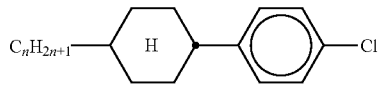

PCH-nCl

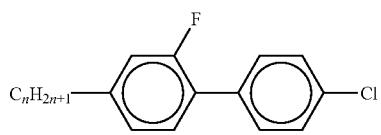

GP-n-Cl

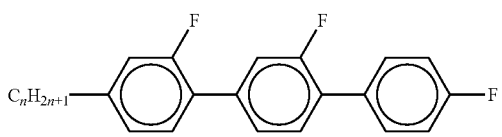

GGP-n-F

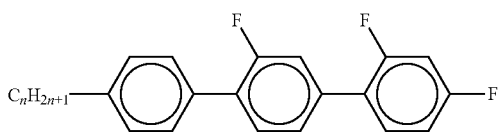

PGIGI-n-F

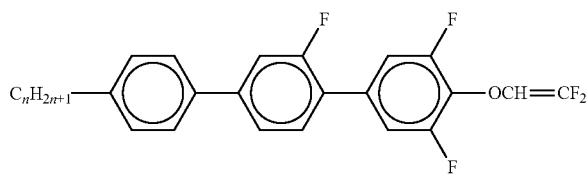

PGU-n-OXF (n = 1-15; (O)$C_nH_{2n+1}$ denotes $C_nH_{2n+1}$ or $OC_nH_{2n+1}$)

The dielectrics may also comprise further additives known to the person skilled in the art and described in the literature, such as, for example, UV stabilisers, such as Tinuvin® from Ciba, antioxidants, free-radical scavengers, nanoparticles, etc. For example, 0-15% of pleochroic dyes, chiral dopants and polymerisable dopants may be added. Suitable stabilisers and dopants are shown below in Tables C, D and E.

TABLE C

Table C shows possible dopants which are generally added to the mixtures according to the invention. The mixtures preferably comprise 0-10% by weight, in particular 0.01-5% by weight and particularly preferably 0.01-3% by weight of dopants.

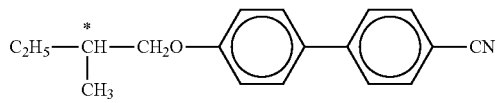

C 15

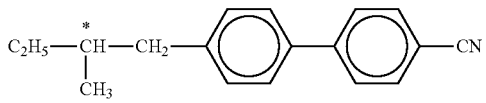

CB 15

TABLE C-continued
Table C shows possible dopants which are generally added to the mixtures according to the invention. The mixtures preferably comprise 0-10% by weight, in particular 0.01-5% by weight and particularly preferably 0.01-3% by weight of dopants.
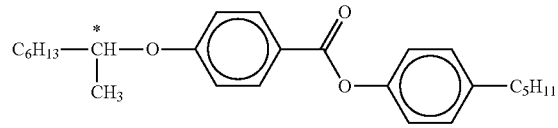
CM 21
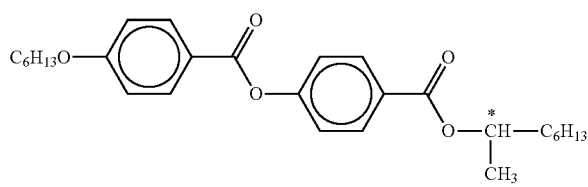
R/S-811
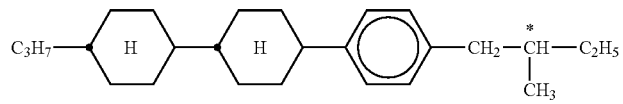
CM 44
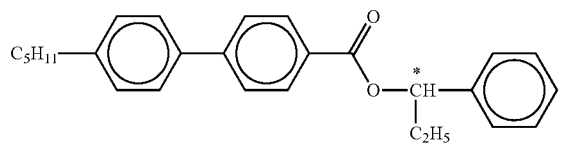
CM 45
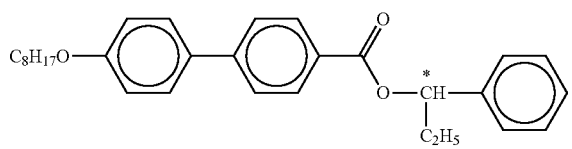
CM 47
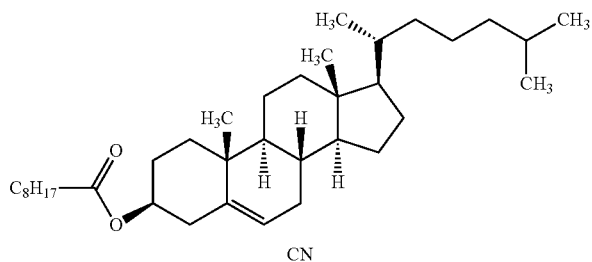
CN
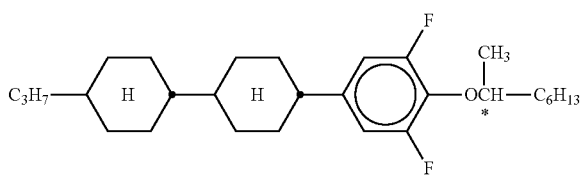
R/S-2011

TABLE C-continued

Table C shows possible dopants which are generally added to the mixtures according to the invention. The mixtures preferably comprise 0-10% by weight, in particular 0.01-5% by weight and particularly preferably 0.01-3% by weight of dopants.

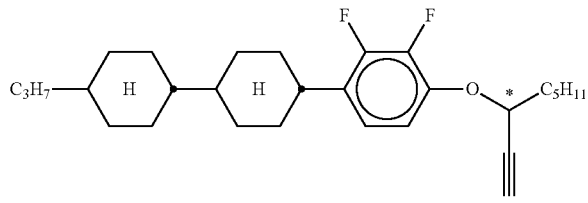

R/S-3011

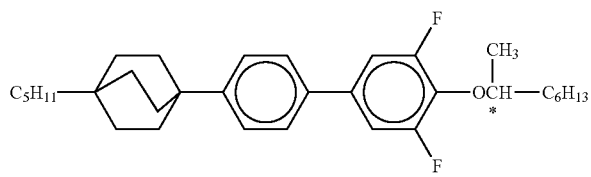

R/S-4011

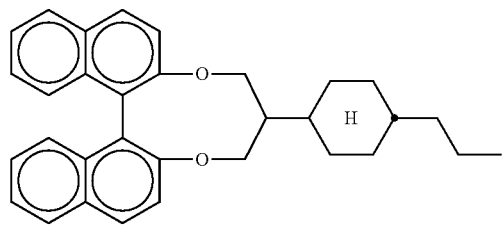

R/S-5011

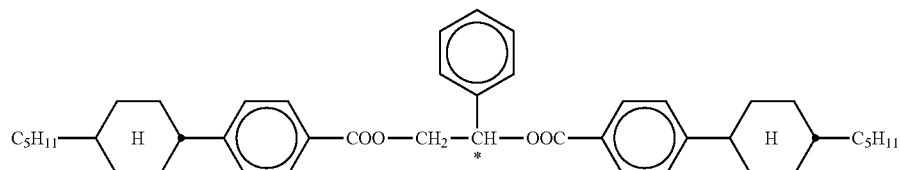

R/S-1011

TABLE D

Stabilisers which can be added, for example, to the mixtures according to the invention in amounts of 0-10% by weight are shown below.

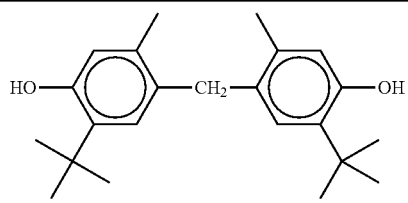

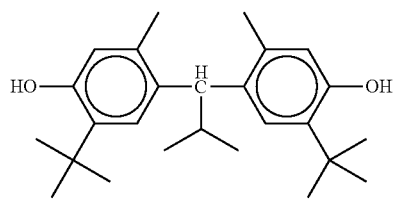

TABLE D-continued
Stabilisers which can be added, for example, to the mixtures according to the invention in amounts of 0-10% by weight are shown below.
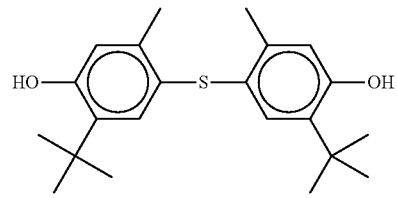
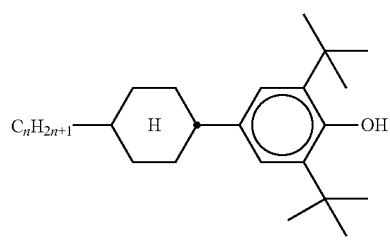
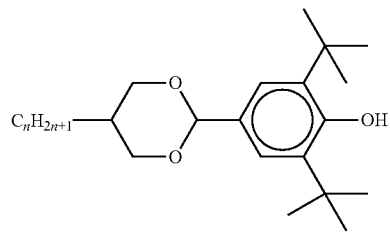
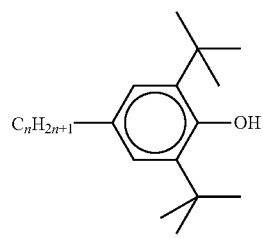
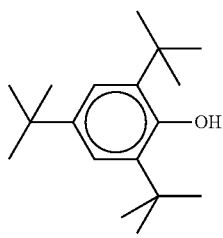
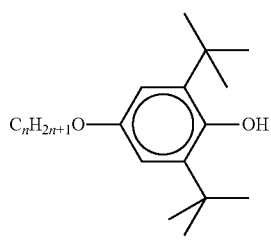

TABLE D-continued
Stabilisers which can be added, for example, to the mixtures according to the invention in amounts of 0-10% by weight are shown below.
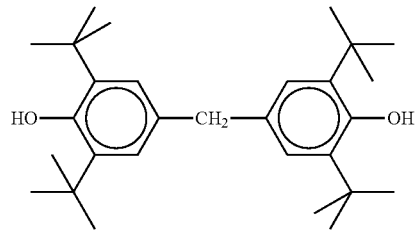
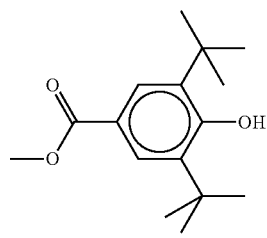
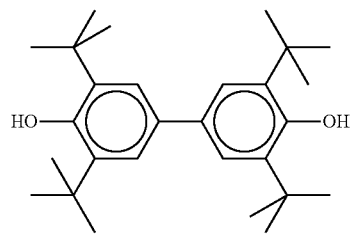
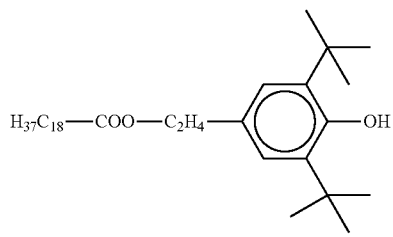
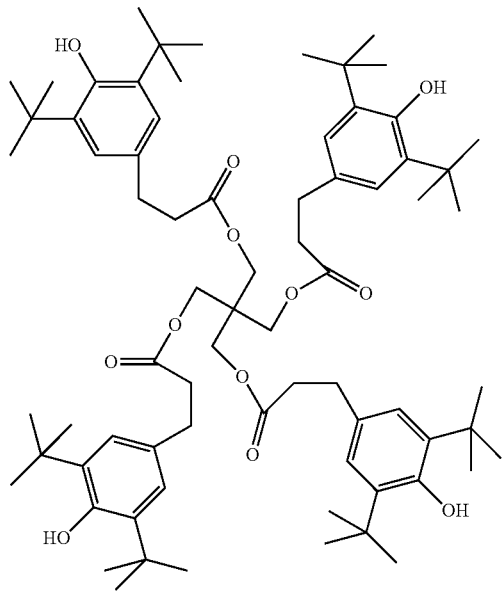 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE D-continued
Stabilisers which can be added, for example, to the mixtures according to the invention in amounts of 0-10% by weight are shown below.
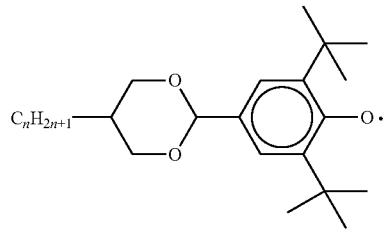
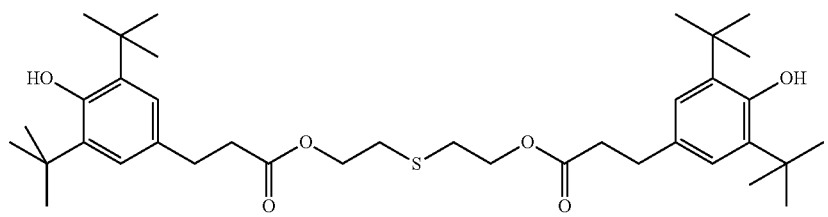 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
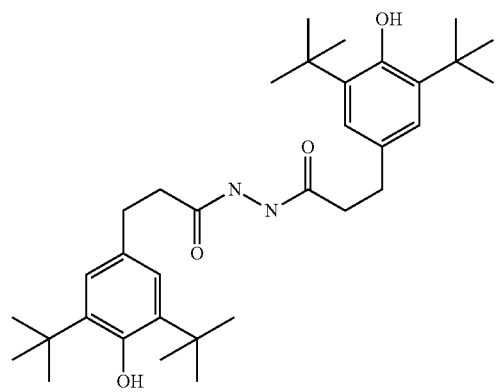 [SMILES: CC(C)(C)c1cc(CCC(=O)NNC(=O)CCc2cc(C(C)(C)C)c(O)c(C(C)(C)C)c2)cc(C(C)(C)C)c1O]
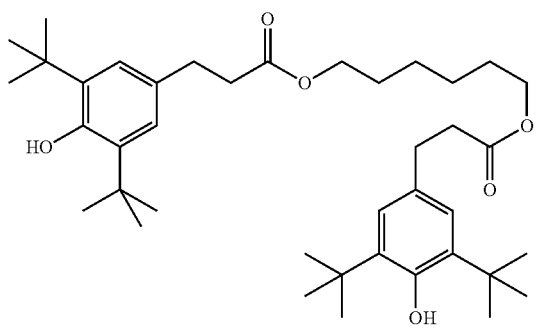 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
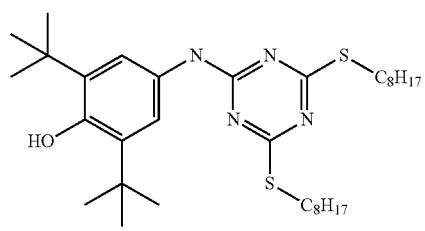

TABLE D-continued
Stabilisers which can be added, for example, to the mixtures according to the invention in amounts of 0-10% by weight are shown below.
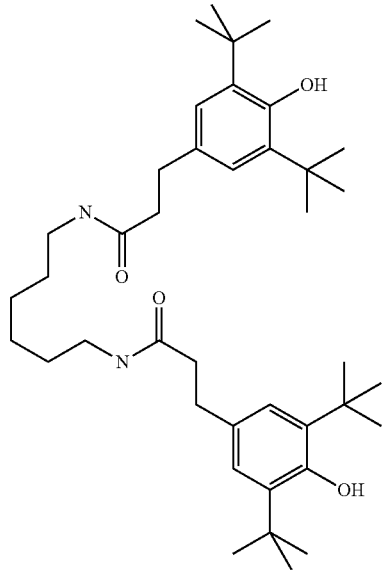 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
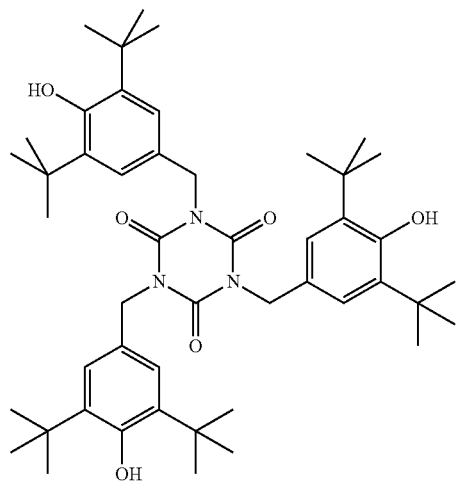 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
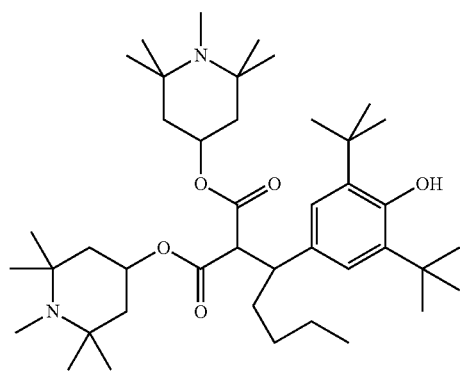 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE D-continued
Stabilisers which can be added, for example, to the mixtures according to
the invention in amounts of 0-10% by weight are shown below.
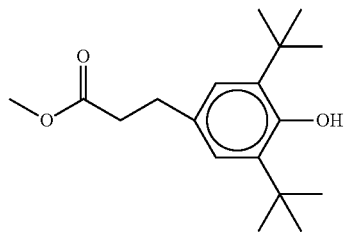
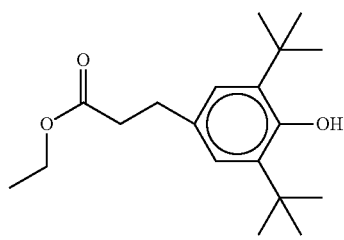
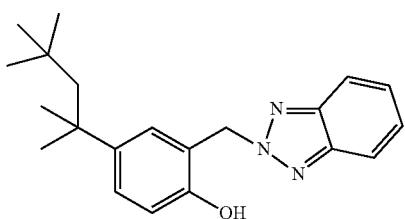 [SMILES: CC(C)(C)CC(C)(C)c1ccc(O)c(Cn2nc3ccccc3n2)c1]
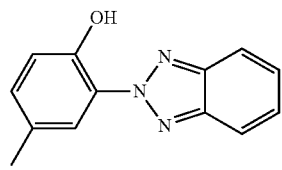 [SMILES: Cc1ccc(O)c(-n2nc3ccccc3n2)c1]
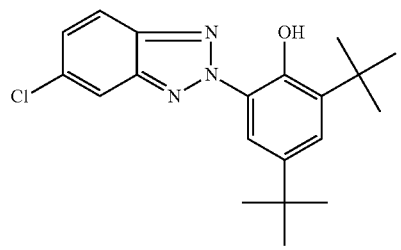 [SMILES: CC(C)(C)c1cc(-n2nc3ccc(Cl)cc3n2)c(O)c(C(C)(C)C)c1]
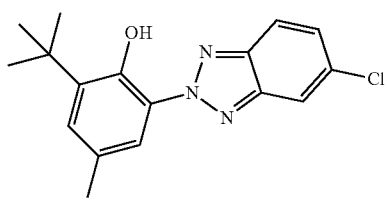 [SMILES: Cc1cc(-n2nc3ccc(Cl)cc3n2)c(O)c(C(C)(C)C)c1]

TABLE D-continued
Stabilisers which can be added, for example, to the mixtures according to the invention in amounts of 0-10% by weight are shown below.
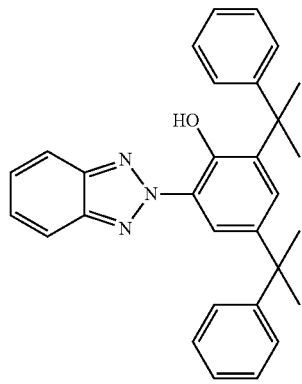 [SMILES: CC(C)(c1ccccc1)c1cc(-n2nc3ccccc3n2)c(O)c(C(C)(C)c2ccccc2)c1]
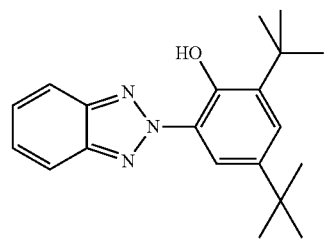 [SMILES: CC(C)(C)c1cc(-n2nc3ccccc3n2)c(O)c(C(C)(C)C)c1]
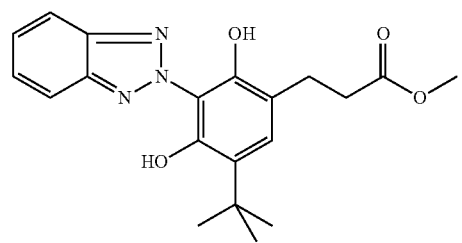 [SMILES: COC(=O)CCc1cc(C(C)(C)C)c(O)c(-n2nc3ccccc3n2)c1O]
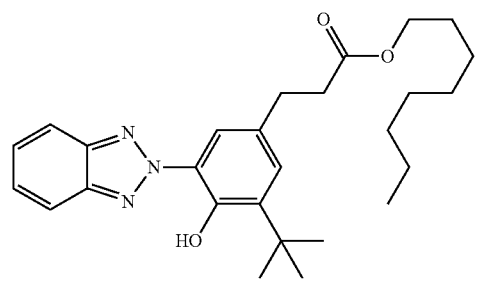 [SMILES: CCCCCCCCOC(=O)CCc1cc(-n2nc3ccccc3n2)c(O)c(C(C)(C)C)c1]

TABLE D-continued
Stabilisers which can be added, for example, to the mixtures according to the invention in amounts of 0-10% by weight are shown below.
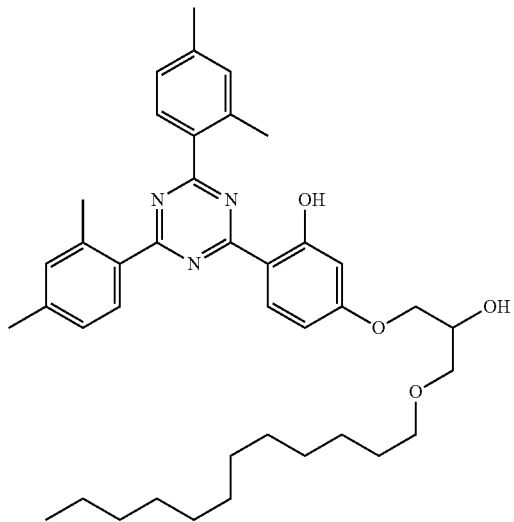
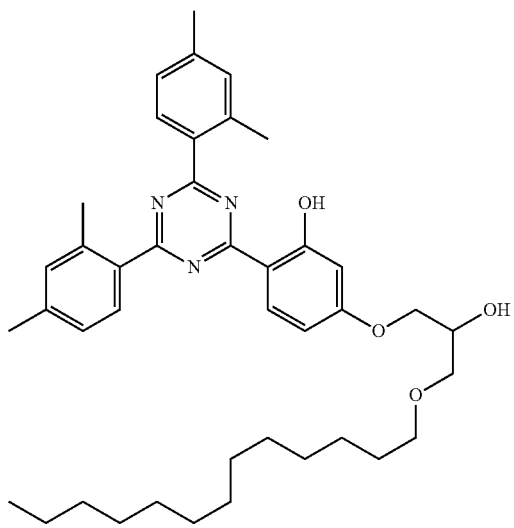
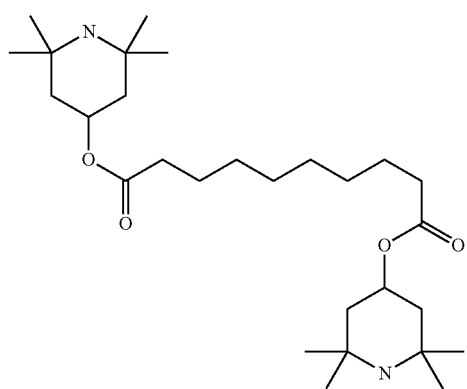

TABLE D-continued
Stabilisers which can be added, for example, to the mixtures according to the invention in amounts of 0-10% by weight are shown below.
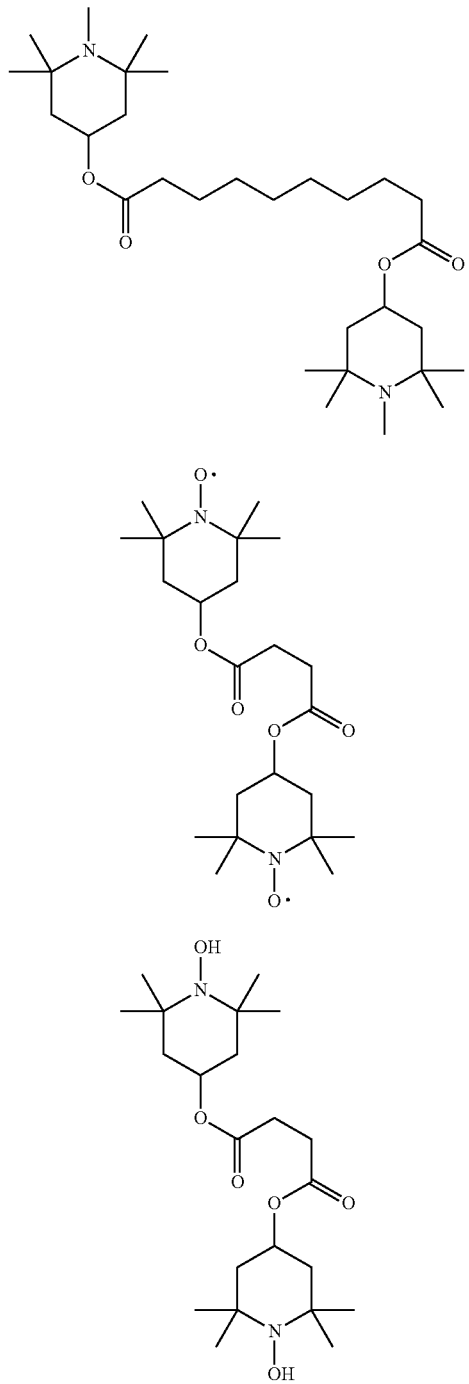
TABLE E
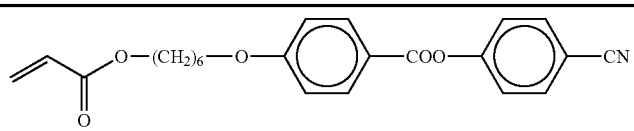

TABLE E-continued
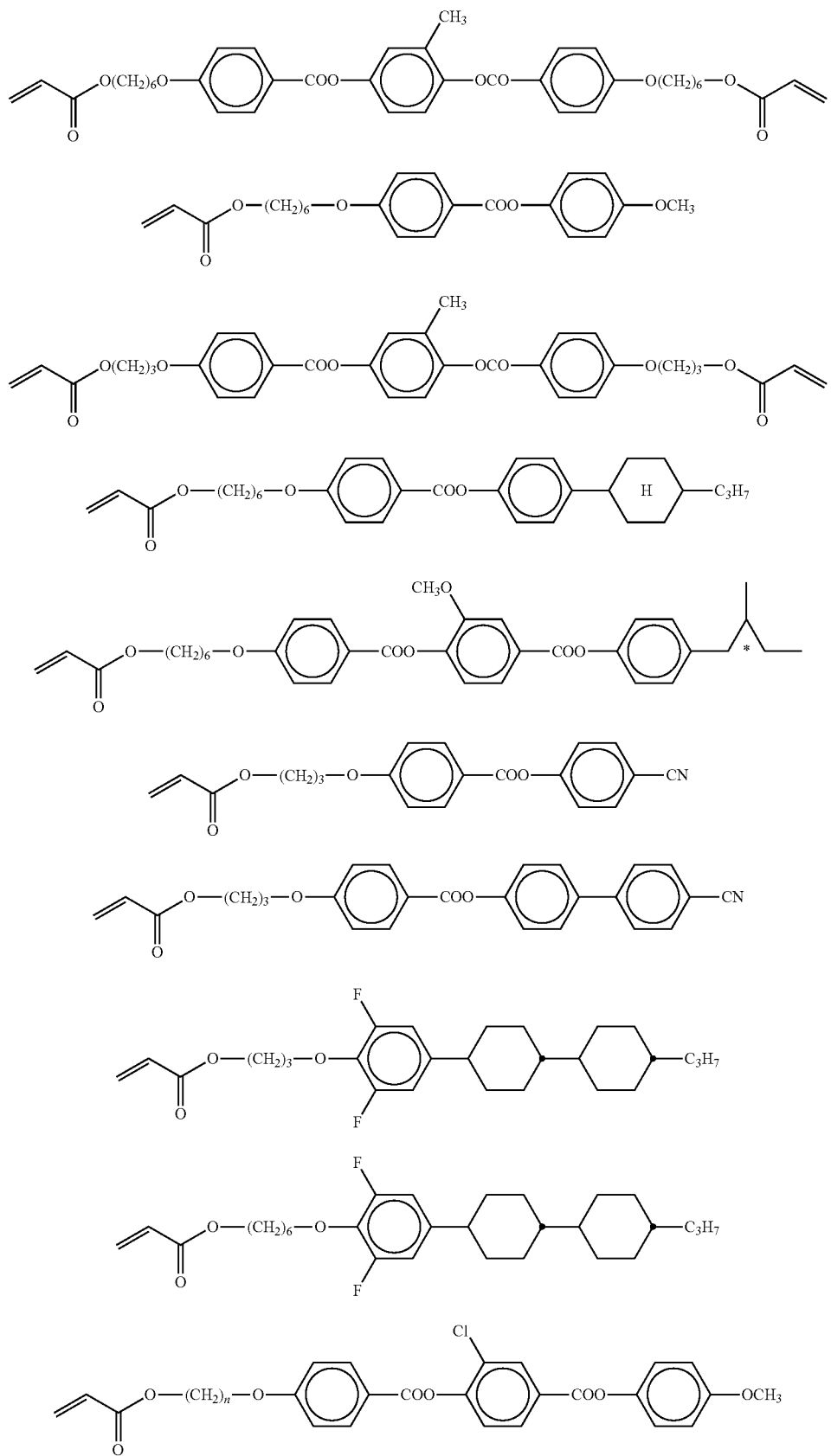

TABLE E-continued
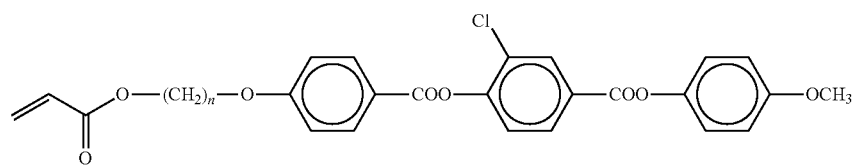
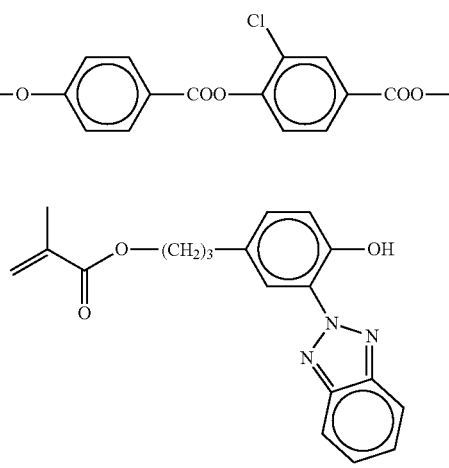
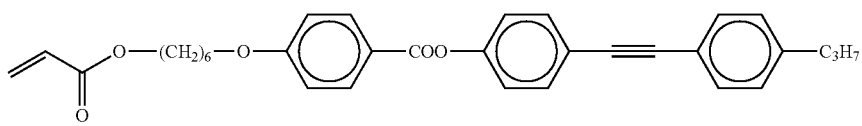
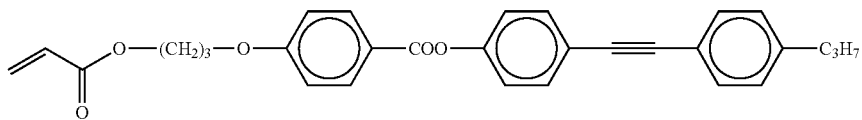
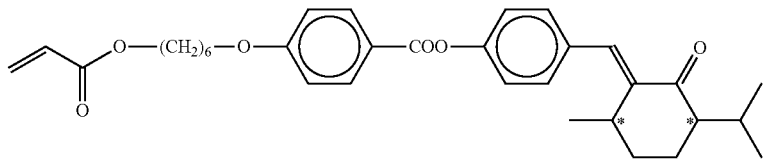
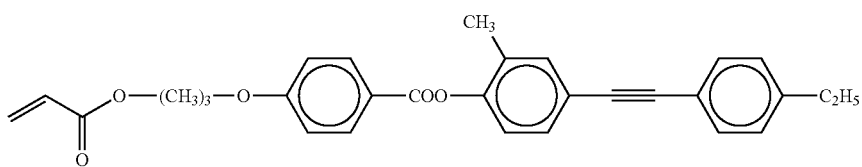
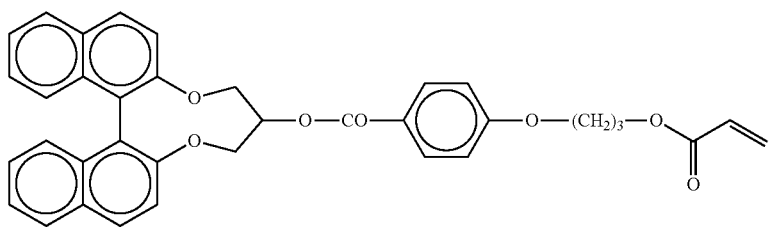
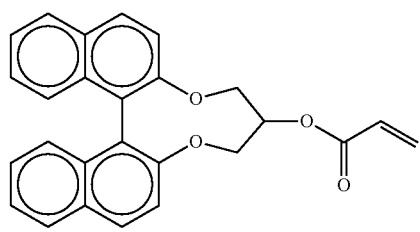

TABLE E-continued
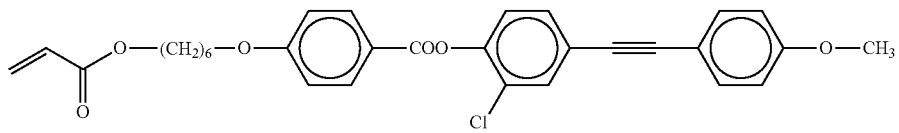
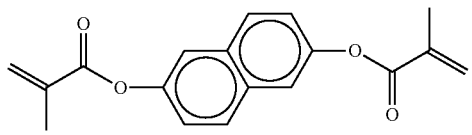
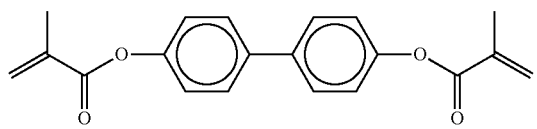
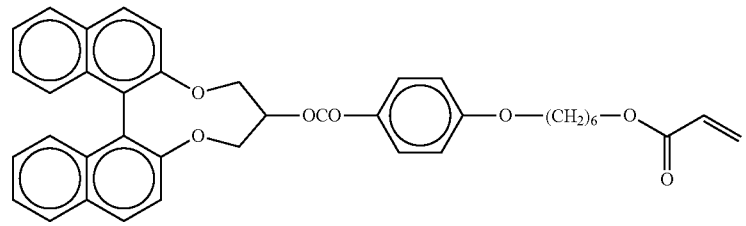
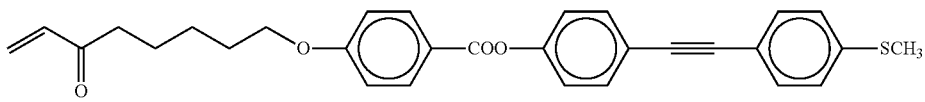
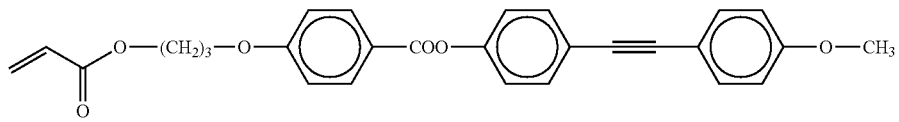
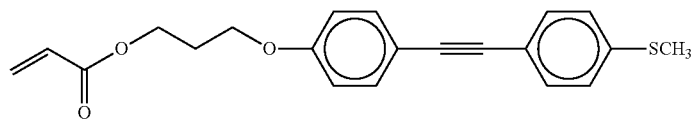
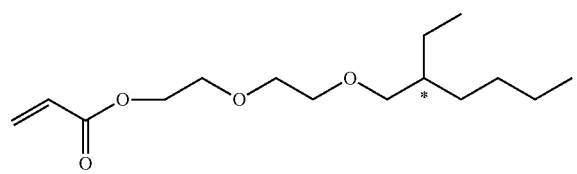 [SMILES: C=CC(=O)OCCOCCOCC(CC)CCCC]
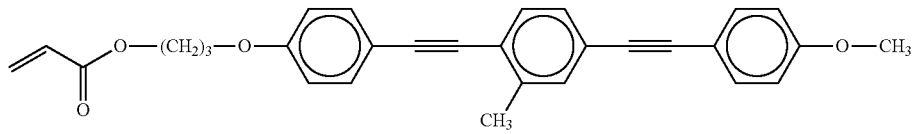
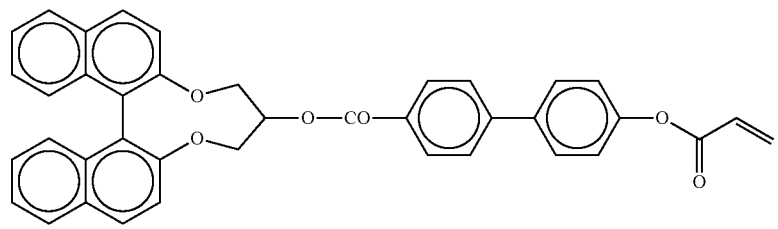

TABLE E-continued
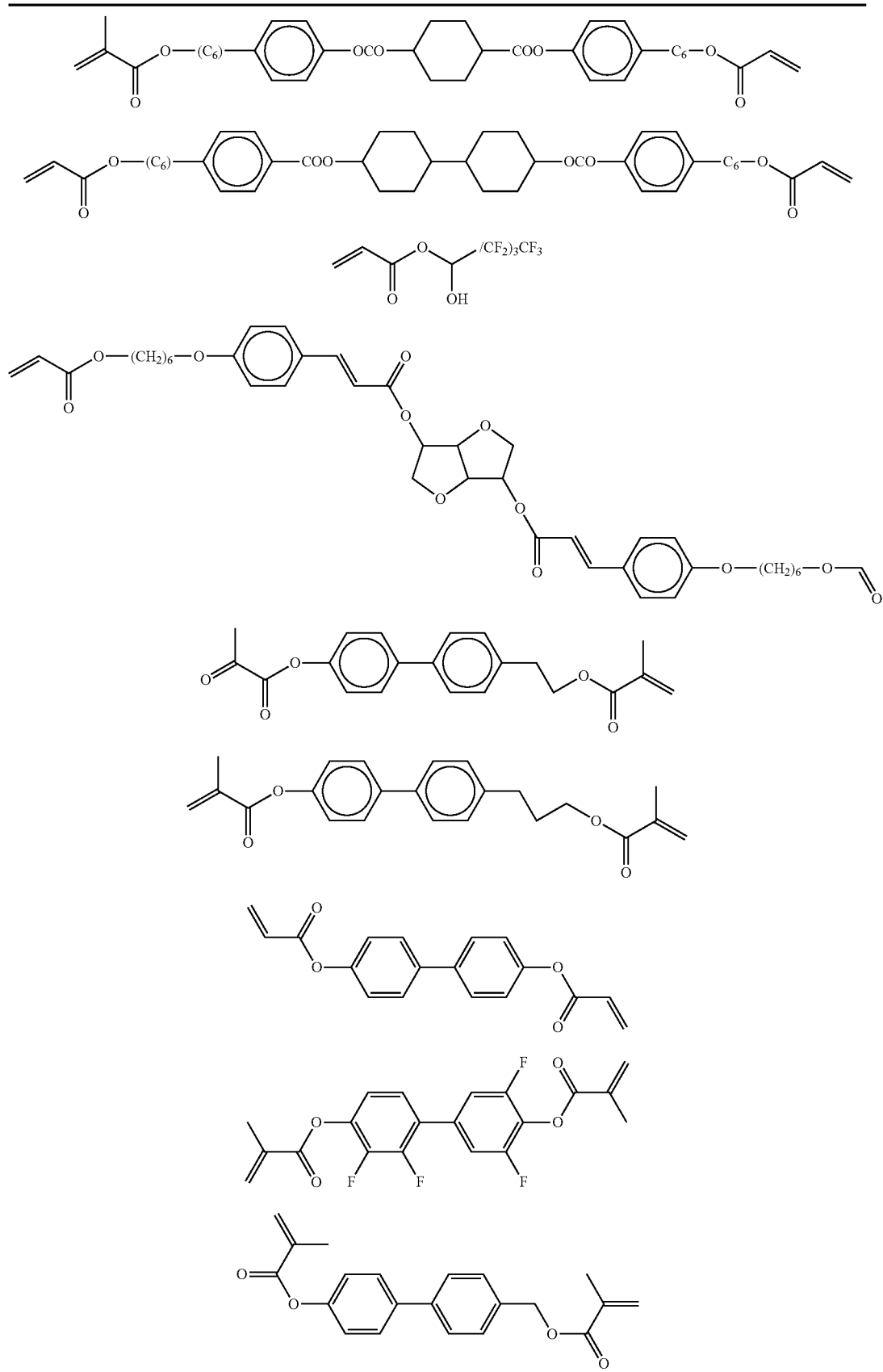

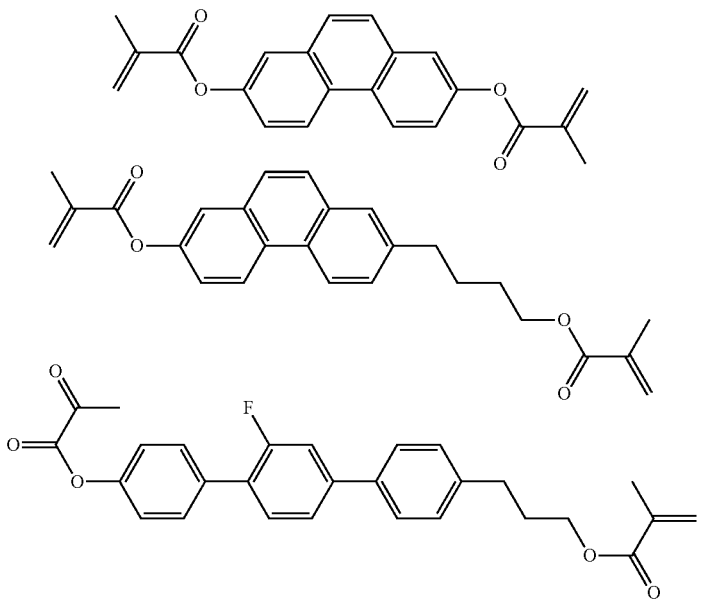

The following examples are intended to explain the invention without limiting it.

Above and below, percentages denote percent by weight. All temperatures are indicated in degrees Celsius. m.p. denotes melting point, cl.p.=clearing point. Furthermore, C=crystalline state, N=nematic phase, S=smectic phase and I=isotropic phase. The numbers between these symbols represent the transition temperatures. Furthermore, $\Delta n$ denotes the optical anisotropy at 589 nm and 20° C.),
$\gamma_1$ denotes the rotational viscosity (mPa·s) at 20° C.,
$V_{10}$ denotes the voltage (V) for 10% transmission (viewing angle perpendicular to the plate surface), (threshold voltage),
$V_{90}$ denotes the voltage (V) for 90% transmission (viewing angle perpendicular to the plate surface),
$\Delta\varepsilon$ denotes the dielectric anisotropy at 20° C. and 1 kHz ($\Delta\varepsilon = \varepsilon_\parallel - \varepsilon_\perp$, where $\varepsilon_\parallel$ denotes the dielectric constant parallel to the longitudinal axes of the molecule and $\varepsilon_\perp$ denotes the dielectric constant perpendicular thereto).

The electro-optical data are measured in a TN cell at the 1st minimum (i.e. at a d·$\Delta n$ value of 0.5 μm) at 20° C., unless expressly indicated otherwise. The optical data are measured at 20° C., unless expressly indicated otherwise. All physical properties are determined in accordance with "Merck Liquid Crystals, Physical Properties of Liquid Crystals" Status November 1997, Merck KGaA, Germany, and apply for a temperature of 20° C., unless explicitly indicated otherwise.

COMPARATIVE EXAMPLE 1

A nematic mixture CM1 having the following physical properties and the following composition is prepared.

| Mixture M1: | | |
|---|---|---|
| Composition Compound | | |
| No. | Abbreviation | c/% |
| 1 | PCH-5F | 4.0 |
| 2 | CCP- | 21.3 |

| Mixture M1: | | |
|---|---|---|
| | 2OCF2.F.F | |
| 3 | CCP-3OCF2.F.F | 20.0 |
| 4 | CCP-5OCF2.F.F | 21.3 |
| 5 | CUP-2F.F | 6.7 |
| 6 | CUP-3F.F | 6.7 |
| 7 | CBC-33F | 6.7 |
| 8 | CBC-53F | 6.7 |
| 9 | CBC-55F | 6.7 |
| Σ | | 100.0 |

| Physical properties | |
|---|---|
| T(N, I) = | 124.5° C. |
| $\Delta n$ (20° C., 589.3 nm) = | 0.105 |
| $\Delta\varepsilon$ (20° C., 1 kHz) = | 8.3 |
| $K_{11}$(20° C.) = | 13.5 pN |
| $K_{33}$(20° C.) = | 18.2 pN |
| $\gamma_1$ (20° C.) = | 444 mPa · s |
| $V_0$ (20° C.) = | 1.35 V |

Example 1

20% by weight of compound (1) are added to mixture CM1, and the physical properties of the mixture (M1) are determined.

Compound (1)

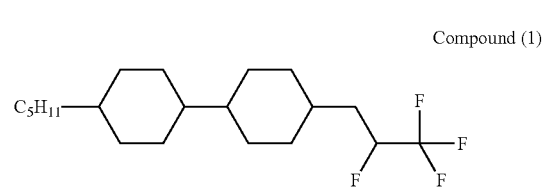

| Physical properties | |
|---|---|
| T(N, I) = | 106.6° C. |
| Δn (20° C., 589.3 nm) = | 0.050 |
| Δε (20° C., 1 kHz) = | 7.00 |
| $K_{11}$(20° C.) = | 14.8 pN |
| $K_{33}$ (20° C.) = | 17.3 pN |
| $γ_1$ (20° C.) = | 124 mPa·s |
| $V_0$ (20° C.) = | 1.53 V |

An IPS display containing mixture M1 has adequate contrast.

Example 2

20% by weight of compound (2) are added to mixture CM1, and the physical properties of the mixture (M2) are determined.

Compound (2)

$C_5H_{11}$—⟨cyclohexyl⟩—⟨cyclohexyl⟩—CH$_2$CF$_2$—F, F, F

| Physical properties | |
|---|---|
| T(N, I) = | 106.4° C. |
| Δn (20° C., 589.3 nm) = | 0.052 |
| Δε (20° C., 1 kHz) = | 7.14 |
| $K_{11}$(20° C.) = | 14.3 pN |
| $K_{33}$ (20° C.) = | 17.5 pN |
| $γ_1$ (20° C.) = | 112 mPa·s |
| $V_0$ (20° C.) = | 1.49 V |

An IPS display containing mixture M2 has adequate contrast.

Example 3

20% by weight of compound (3) are added to mixture CM1, and the physical properties of the mixture (M3) are determined.

Compound (3)

$C_3H_7$—⟨cyclohexyl⟩—⟨cyclohexyl⟩—CH$_2$CF$_2$—F, F, F

| Physical properties | |
|---|---|
| T(N, I) = | 103.4° C. |
| Δn (20° C., 589.3 nm) = | 0.054 |
| Δε (20° C., 1 kHz) = | 7.17 |
| $K_{11}$(20° C.) = | 13.6 pN |
| $K_{33}$ (20° C.) = | 18.0 pN |
| $γ_1$ (20° C.) = | 82 mPa·s |
| $V_0$ (20° C.) = | 1.45 V |

An IPS display containing mixture M3 has adequate contrast.

Example 4

20% by weight of compound (4) are added to mixture CM1, and the physical properties of the mixture (M4) are determined.

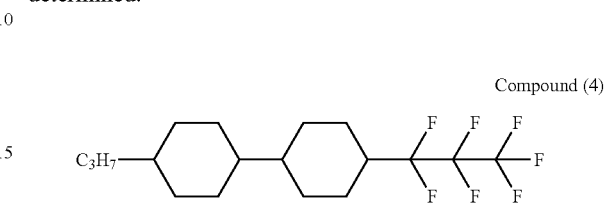

Compound (4)

| Physical properties | |
|---|---|
| T(N, I) = | 108.4° C. |
| Δn (20° C., 589.3 nm) = | 0.062 |
| Δε (20° C., 1 kHz) = | 7.73 |
| $K_{11}$(20° C.) = | 14.2 pN |
| $K_{33}$ (20° C.) = | 17.7 pN |
| $γ_1$ (20° C.) = | 91 mPa·s |
| $V_0$ (20° C.) = | 1.43 V |

An IPS display containing mixture M4 has adequate contrast.

Example 5

20% by weight of compound (5) are added to mixture CM1, and the physical properties of the mixture (M5) are determined.

Compound (5)

$C_3H_7$—⟨cyclohexyl⟩—⟨cyclohexyl⟩—CH$_2$CF$_2$—F, F, F

| Physical properties | |
|---|---|
| T(N, I) = | 105.4° C. |
| Δn (20° C., 589.3 nm) = | 0.057 |
| Δε (20° C., 1 kHz) = | 6.79 |
| $K_{11}$(20° C.) = | 13.1 pN |
| $K_{33}$ (20° C.) = | 17.8 pN |
| $γ_1$ (20° C.) = | 76 mPa·s |
| $V_0$ (20° C.) = | 1.467 V |

An IPS display containing mixture M5 has adequate contrast.

Example 6

20% by weight of compound (6) are added to mixture CM1, and the physical properties of the mixture (M6) are determined.

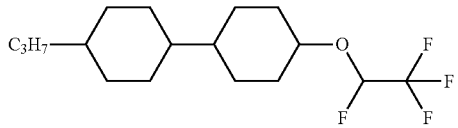

Compound (6)

| Physical properties | |
|---|---|
| T(N, I) = | 98.9° C. |
| Δn (20° C., 589.3 nm) = | 0.053 |
| Δε (20° C., 1 kHz) = | 7.89 |
| $K_{11}$(20° C.) = | 12.9 pN |
| $K_{33}$(20° C.) = | 17.2 pN |
| $γ_1$ (20° C.) = | 111 mPa·s |
| $V_0$ (20° C.) = | 1.35 V |

An IPS display containing mixture M6 has adequate contrast.

Example 7

20% by weight of compound (7) are added to mixture CM1, and the physical properties of the mixture (M7) are determined.

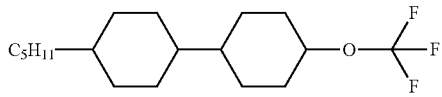

Compound (7)

| Physical properties | |
|---|---|
| T(N, I) = | 94.8° C. |
| Δn (20° C., 589.3 nm) = | 0.059 |
| Δε (20° C., 1 kHz) = | 7.55 |
| $K_{11}$(20° C.) = | 11.9 pN |
| $K_{33}$(20° C.) = | 17.1 pN |
| $γ_1$ (20° C.) = | 89 mPa·s |
| $V_0$ (20° C.) = | 1.33 V |

An IPS display containing mixture M7 has adequate contrast.

Example 8

20% by weight of compound (8) are added to mixture CM1, and the physical properties of the mixture (M8) are determined.

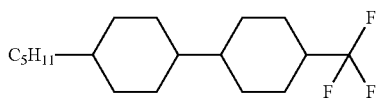

Compound (8)

| Physical properties | |
|---|---|
| T(N, I) = | 90.4° C. |
| Δn (20° C., 589.3 nm) = | 0.051 |
| Δε (20° C., 1 kHz) = | 7.04 |
| $K_{11}$(20° C.) = | 12.18 pN |
| $K_{33}$(20° C.) = | 15.22 pN |
| $γ_1$ (20° C.) = | 99 mPa·s |
| $V_0$ (20° C.) = | 1.39 V |

An IPS display containing mixture M8 has adequate contrast.

Example 9

20% by weight of compound (9) are added to mixture CM1, and the physical properties of the mixture (M9) are determined.

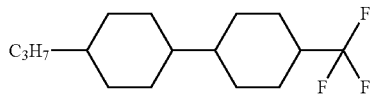

Compound (9)

| Physical properties | |
|---|---|
| T(N, I) = | 87.5° C. |
| Δn (20° C., 589.3 nm) = | 0.059 |
| Δε (20° C., 1 kHz) = | 7.31 |
| $K_{11}$(20° C.) = | 12.3 pN |
| $K_{33}$(20° C.) = | 15.1 pN |
| $γ_1$ (20° C.) = | 63 mPa·s |
| $V_0$ (20° C.) = | 1.37 V |

An IPS display containing mixture M9 has adequate contrast.

Example 10

20% by weight of compound (10) are added to mixture CM1, and the physical properties of the mixture (M10) are determined.

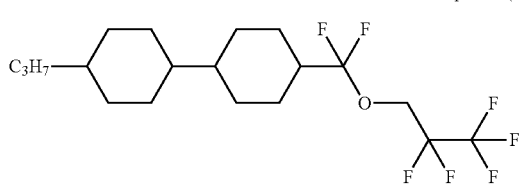

Compound (10)

| Physical properties | |
|---|---|
| T(N, I) = | 92.2° C. |
| Δn (20° C., 589.3 nm) = | 0.055 |
| Δε (20° C., 1 kHz) = | 6.29 |
| $K_{11}$(20° C.) = | 11.4 pN |
| $K_{33}$(20° C.) = | 13.7 pN |
| $γ_1$ (20° C.) = | 101 mPa·s |
| $V_0$ (20° C.) = | 1.42 V |

An IPS display containing mixture M10 has adequate contrast.

Example 11

20% by weight of compound (11) are added to mixture CM1, and the physical properties of the mixture (M11) are determined.

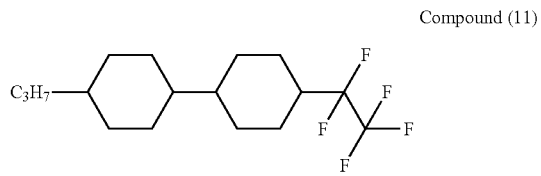

Compound (11)

| Physical properties | |
| --- | --- |
| T(N, I) = | 92.9° C. |
| Δn (20° C., 589.3 nm) = | 0.050 |
| Δε (20° C., 1 kHz) = | 7.22 |
| $K_{11}$(20° C.) = | 11.0 pN |
| $K_{33}$ (20° C.) = | 14.3 pN |
| $γ_1$ (20° C.) = | 76 mPa · s |
| $V_0$ (20° C.) = | 1.30 V |

An IPS display containing mixture M11 has adequate contrast.

Example 12

20% by weight of compound (12) are added to mixture CM1, and the physical properties of the mixture (M12) are determined.

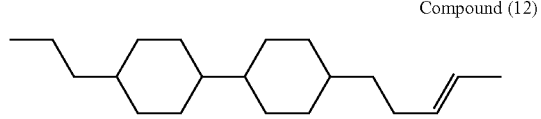 [SMILES: C/C=C/CCC1CCC(C2CCC(CCC)CC2)CC1]

Compound (12)

| Physical properties | |
| --- | --- |
| T(N, I) = | 114.4° C. |
| Δn (20° C., 589.3 nm) = | 0.059 |
| Δε (20° C., 1 kHz) = | 6.26 |
| $K_{11}$(20° C.) = | 15.3 pN |
| $K_{33}$ (20° C.) = | 19.0 pN |
| $γ_1$ (20° C.) = | 43 mPa · s |
| $V_0$ (20° C.) = | 1.65 V |

An IPS display containing mixture M12 has adequate contrast.

Example 13

20% by weight of compound (13) are added to mixture CM1, and the physical properties of the mixture (M131 are determined.

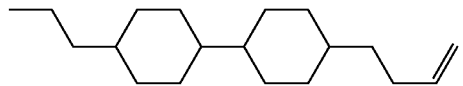

Compound (13)

| Physical properties | |
| --- | --- |
| T(N, I) = | 109.5° C. |
| Δn (20° C., 589.3 nm) = | 0.057 |
| Δε (20° C., 1 kHz) = | 6.12 |
| $K_{11}$(20° C.) = | 14.0 pN |
| $K_{33}$ (20° C.) = | 18.6 pN |
| $γ_1$ (20° C.) = | 28 mPa · s |
| $V_0$ (20° C.) = | 1.60 V |

An IPS display containing mixture M13 has adequate contrast.

Example 14

20% by weight of compound (14) are added to mixture CM1, and the physical properties of the mixture (M14) are determined.

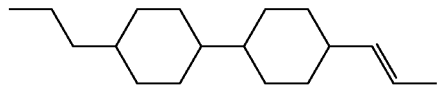

Compound (14)

| Physical properties | |
| --- | --- |
| T(N, I) = | 113.1° C. |
| Δn (20° C., 589.3 nm) = | 0.066 |
| Δε (20° C., 1 kHz) = | 6.15 |
| $K_{11}$(20° C.) = | 14.3 pN |
| $K_{33}$ (20° C.) = | 18.3 pN |
| $γ_1$ (20° C.) = | 37 mPa · s |
| $V_0$ (20° C.) = | 1.61 V |

An IPS display containing mixture M14 has adequate contrast.

Example 15

20% by weight of compound (15) are added to mixture CM1, and the physical properties of the mixture (M15) are determined.

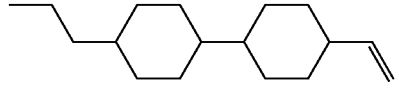

Compound (15)

| Physical properties | |
| --- | --- |
| T(N, I) = | 102.2° C. |
| Δn (20° C., 589.3 nm) = | 0.052 |
| Δε (20° C., 1 kHz) = | 6.10 |

| Physical properties | |
|---|---|
| $K_{11}(20°\,C.) =$ | 12.5 pN |
| $K_{33}(20°\,C.) =$ | 16.2 pN |
| $\gamma_1(20°\,C.) =$ | 18 mPa·s |
| $V_0(20°\,C.) =$ | 1.51 V |

An IPS display containing mixture M15 has adequate contrast.

Example 16

20% by weight of compound (16) are added to mixture CM1, and the physical properties of the mixture (M16) are determined.

Compound (16)

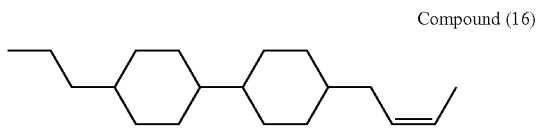 [SMILES: C/C=C\CC1CCC(C2CCC(CCC)CC2)CC1]

| Physical properties | |
|---|---|
| T(N, I) = | 90.8° C. |
| Δn (20° C., 589.3 nm) = | 0.040 |
| Δε (20° C., 1 kHz) = | 5.83 |
| $K_{11}(20°\,C.) =$ | 11.9 pN |
| $K_{33}(20°\,C.) =$ | 12.5 pN |
| $\gamma_1(20°\,C.) =$ | 29 mPa·s |
| $V_0(20°\,C.) =$ | 1.51 V |

An IPS display containing mixture M16 has adequate contrast.

Example 17

20% by weight of compound (17) are added to mixture CM1, and the physical properties of the mixture (M17) are determined.

Compound (17)

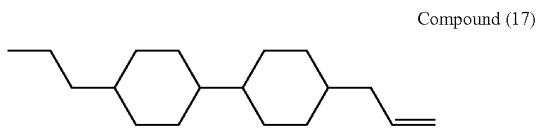 [SMILES: C=CCC1CCC(C2CCC(CCC)CC2)CC1]

| Physical properties | |
|---|---|
| T(N, I) = | 94.4° C. |
| Δn (20° C., 589.3 nm) = | 0.042 |
| Δε (20° C., 1 kHz) = | 5.70 |
| $K_{11}(20°\,C.) =$ | 11.6 pN |
| $K_{33}(20°\,C.) =$ | 13.3 pN |
| $\gamma_1(20°\,C.) =$ | 27 mPa·s |
| $V_0(20°\,C.) =$ | 1.51 V |

An IPS display containing mixture M17 has adequate contrast.

Example 18

20% by weight of compound (18) are added to mixture CM1, and the physical properties of the mixture (M18) are determined.

Compound (18)

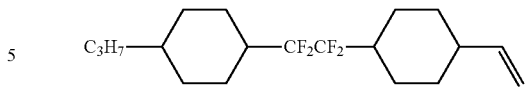

| Physical properties | |
|---|---|
| T(N, I) = | 120.8° C. |
| Δn (20° C., 589.3 nm) = | 0.056 |
| Δε (20° C., 1 kHz) = | 6.60 |
| $K_{11}(20°\,C.) =$ | 14.5 pN |
| $K_{33}(20°\,C.) =$ | 19.1 pN |
| $\gamma_1(20°\,C.) =$ | 74 mPa·s |
| $V_0(20°\,C.) =$ | 1.54 V |

An IPS display containing mixture M18 has adequate contrast.

Example 19

20% by weight of compound (19) are added to mixture CM1, and the physical properties of the mixture (M19) are determined.

Compound (19)

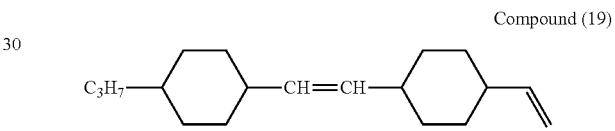

| Physical properties | |
|---|---|
| T(N, I) = | 113.6° C. |
| Δn (20° C., 589.3 nm) = | 0.072 |
| Δε (20° C., 1 kHz) = | 6.20 |
| $K_{11}(20°\,C.) =$ | 13.7 pN |
| $K_{33}(20°\,C.) =$ | 20.4 pN |
| $\gamma_1(20°\,C.) =$ | 44 mPa·s |
| $V_0(20°\,C.) =$ | 1.55 V |

An IPS display containing mixture M19 has adequate contrast.

Example 20

10% by weight of compound (20) are added to mixture CM1, and the physical properties of the mixture (M20) are determined.

Compound (20)

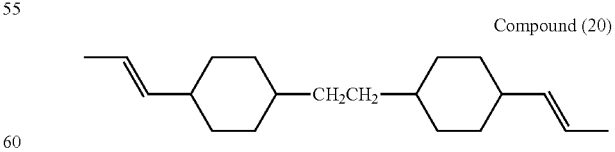

| Physical properties | |
|---|---|
| T(N, I) = | 118.7° C. |
| Δn (20° C., 589.3 nm) = | 0.080 |

-continued

| Physical properties | |
|---|---|
| $\Delta\varepsilon$ (20° C., 1 kHz) = | 6.35 |
| $K_{11}$ (20° C.) = | 14.5 pN |
| $K_{33}$ (20° C.) = | 18.0 pN |
| $\gamma_1$ (20° C.) = | 48 mPa·s |
| $V_0$ (20° C.) = | 1.60 V |

An IPS display containing mixture M20 has adequate contrast.

Example 21

A nematic mixture M21 having the following physical properties and the following composition is prepared.

| | | | |
|---|---|---|---|
| CC-3-V | 32.00% | T(N, I) [° C.]: | 93.5 |
| CC-3-V1 | 12.00% | | |
| CCP-V2-1 | 5.00% | $\Delta$n [589 nm, 20° C.] | 0.103 |
| CCQU-3-F | 11.00% | $\Delta\varepsilon$ [kHz, 20° C.]: | +12.1 |
| CCP-3OCF3 | 4.00% | $\gamma_1$ [mPa·s, 20° C.]: | 95 |
| CCGU-3-F | 5.00% | $K_1$ [20° C.]: | 14.0 |
| APUQU-2-F | 8.00% | $K_3$ [20° C.]: | 17.3 |
| APUQU-3-F | 8.00% | $V_0$ [V]: | 1.15 |
| PGUQU-3-F | 5.00% | | |
| PGUQU-4-F | 5.00% | | |
| PGUQU-5-F | 5.00% | | |

An IPS display containing mixture M21 has adequate contrast.

Example 22

A nematic mixture M22 having the following physical properties and the following composition is prepared.

| | | | |
|---|---|---|---|
| CC-3-V | 28.00% | T(N, I) [° C.]: | 94.5 |
| CC-3-V1 | 9.00% | $\Delta$n [589 nm, 20° C.] | 0.103 |
| CC-3-2V1 | 9.00% | $\Delta\varepsilon$ [kHz, 20° C.]: | +12.3 |
| CCP-V2-1 | 3.00% | $\gamma_1$ [mPa·s, 20° C.]: | 100 |
| CCQU-3-F | 11.00% | $K_1$ [20° C.]: | 15.1 |
| CCP-3OCF3 | 4.00% | $K_3$ [20° C.]: | 17.2 |
| CCGU-3-F | 5.00% | $V_0$ [V]: | 1.16 |
| APUQU-2-F | 8.00% | | |
| APUQU-3-F | 8.00% | | |
| PGUQU-3-F | 5.00% | | |
| PGUQU-4-F | 5.00% | | |
| PGUQU-5-F | 5.00% | | |

An IPS display containing mixture M22 has adequate contrast.

Example 23

A nematic mixture M23 having the following physical properties and the following composition is prepared.

| | | | |
|---|---|---|---|
| CC-3-V | 31.00% | T(N, I) [° C.]: | 90.5 |
| CC-3-V1 | 9.00% | $\Delta$n [589 nm, 20° C.] | 0.101 |
| CC-3-2V1 | 9.00% | $\Delta\varepsilon$ [kHz, 20° C.]: | +11.9 |
| CCQU-3-F | 9.00% | $\gamma_1$ [mPa·s, 20° C.]: | 92 |
| CCP-3OCF3 | 6.00% | $K_1$ [20° C.]: | 14.7 |
| CCGU-3-F | 5.00% | $K_3$ [20° C.]: | 16.9 |
| APUQU-2-F | 8.00% | $V_0$ [V]: | 1.17 |
| APUQU-3-F | 8.00% | | |
| PGUQU-3-F | 5.00% | | |
| PGUQU-4-F | 5.00% | | |
| PGUQU-5-F | 5.00% | | |

An IPS display containing mixture M23 has adequate contrast.

Example 24

A nematic mixture M24 having the following physical properties and the following composition is prepared.

| | | | |
|---|---|---|---|
| CC-3-V | 30.00% | T(N, I) [° C.]: | 93.5 |
| CC-3-V1 | 12.00% | $\Delta$n [589 nm, 20° C.] | 0.085 |
| CCP-V2-1 | 4.00% | $\Delta\varepsilon$ [kHz, 20° C.]: | +10.1 |
| CCGU-3-F | 7.00% | $\gamma_1$ [mPa·s, 20° C.]: | 96 |
| ACQU-3F | 5.00% | $K_1$ [20° C.]: | 14.2 |
| CCQU-3-F | 12.00% | $K_3$ [20° C.]: | 17.1 |
| CCQU-5-F | 12.00% | $V_0$ [V]: | 1.25 |
| APUQU-2-F | 9.00% | | |
| APUQU-3-F | 9.00% | | |

An IPS display containing mixture M24 has adequate contrast.

Example 25

A nematic mixture M25 having the following physical properties and the following composition is prepared.

| | | | |
|---|---|---|---|
| CC-3-V | 32.00% | T(N, I) [° C.]: | 96.0 |
| CC-3-V1 | 12.00% | $\Delta$n [589 nm, 20° C.] | 0.084 |
| CCP-V2-1 | 5.00% | $\Delta\varepsilon$ [kHz, 20° C.]: | +9.9 |
| CCGU-3-F | 7.00% | $\gamma_1$ [mPa·s, 20° C.]: | 94 |
| CCQU-3-F | 12.00% | $K_1$ [20° C.]: | 14.5 |
| CCQU-5-F | 10.00% | $K_3$ [20° C.]: | 18.2 |
| APUQU-2-F | 6.00% | $V_0$ [V]: | 1.27 |
| APUQU-3-F | 8.00% | | |
| CDUQU-3-F | 8.00% | | |

An IPS display containing mixture M25 has adequate contrast.

Example 26

A nematic mixture M26 having the following physical properties and the following composition is prepared.

| | | | |
|---|---|---|---|
| CC-3-V | 32.00% | T(N, I) [° C.]: | 93.5 |
| CC-3-V1 | 12.00% | $\Delta$n [589 nm, 20° C.] | 0.103 |
| CCP-V2-1 | 5.00% | $\Delta\varepsilon$ [kHz, 20° C.]: | +12.1 |
| CCQU-3-F | 11.00% | $\gamma_1$ [mPa·s, 20° C.]: | 95 |
| CCP-3-0CF3 | 4.00% | $K_1$ [20° C.]: | 14.0 |
| CCGU-3-F | 5.00% | $K_3$ [20° C.]: | 17.3 |
| APUQU-2-F | 8.00% | $V_0$ [V]: | 1.13 |
| APUQU-3-F | 8.00% | | |
| PGUQU-3-F | 5.00% | | |
| PGUQU-4-F | 5.00% | | |
| PGUQU-5-F | 8.00% | | |

An IPS display containing mixture M26 has adequate contrast.

Example 27

A nematic mixture M27 having the following physical properties and the following composition is prepared.

| | | | |
|---|---|---|---|
| CC-3-V | 29.00% | T(N, I) [° C.]: | 90.5 |
| CC-3-V1 | 12.00% | Δn [589 nm, 20° C.] | 0.104 |
| CCP-V2-1 | 7.00% | Δε [kHz, 20° C.]: | +11.8 |
| CCQU-3-F | 10.00% | $\gamma_1$ [mPa · s, 20° C.]: | 94 |
| PP-1-2V1 | 6.00% | $K_1$ [20° C.]: | 15.0 |
| CCGU-3-F | 5.00% | $K_3$ [20° C.]: | 16.8 |
| APUQU-2-F | 6.00% | $V_0$ [V]: | 1.19 |
| APUQU-3-F | 8.00% | | |
| PGUQU-3-F | 5.00% | | |
| PGUQU-4-F | 4.00% | | |
| CDUQU-3-F | 8.00% | | |

An IPS display containing mixture M2/has adequate contrast.

Example 28

A nematic mixture M28 having the following physical properties and the following composition is prepared.

| | | | |
|---|---|---|---|
| CC-3-V | 32.00% | T(N, I) [° C.]: | 87.0 |
| CC-3-V1 | 12.00% | Δn [589 nm, 20° C.] | 0.102 |
| CCP-V2-1 | 4.00% | Δε [kHz, 20° C.]: | +12.0 |
| CCQU-3-F | 10.00% | $\gamma_1$ [mPa · s, 20° C.]: | 87 |
| PP-1-2V1 | 5.00% | $K_1$ [20° C.]: | 14.0 |
| CCGU-3-F | 5.00% | $K_3$ [20° C.]: | 16.3 |
| APUQU-2-F | 6.00% | $V_0$ [V]: | 1.14 |
| APUQU-3-F | 8.00% | | |
| PGUQU-3-F | 5.00% | | |
| PGUQU-4-F | 5.00% | | |
| CDUQU-3-F | 8.00% | | |

An IPS display containing mixture M28 has adequate contrast.

The invention claimed is:

1. A liquid-crystalline medium having positive dielectric anisotropy, comprising a compound of formula I2a-1

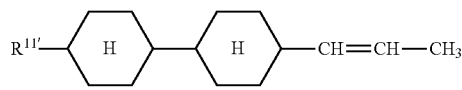

a compound of formula I2a-3

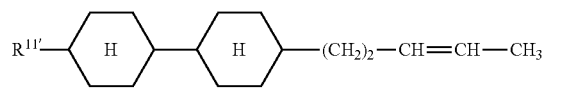

and a compound of formula I2b-1

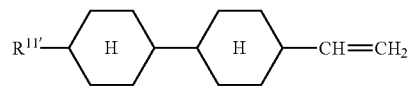

and optionally at least one compound of formula I1 or I3,

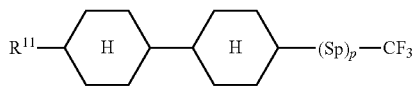

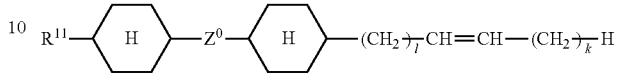

in which
$R^{11}$ denotes an alkyl or alkenyl radical having up to 15 C atoms which is unsubstituted, monosubstituted by CN or $CF_3$, or at least monosubstituted by halogen, where, in addition, one or more $CH_2$ groups in these radicals may be replaced by —O—, —S—,

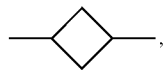

—C≡C—, —OC—O—, or —COO— in such a way that O atoms are not linked directly to one another,
$R^{11*}$ denotes an unsubstituted alkyl or alkenyl radical having up to 15 C atoms, where, in addition, one or more $CH_2$ groups in these radicals may be replaced by —O—, —S—,

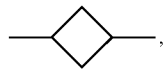

—C≡C—, —OC—O—, or —COO— in such a way that O atoms are not linked directly to one another,
$Z^0$ denotes —COO—, —OCO—, —$CH_2$O—, —O$CH_2$—, —$CF_2$—O—, —O—$CF_2$—, —$CH_2$—$CH_2$—, —$CF_2$—$CF_2$—, —CFH—CFH—, —CH=CH—, —CF=CF—, —CF=CH—, —C≡C—, or —CH=CF—,
Sp denotes O, an alkylene, alkyleneoxy, oxaalkylene or alkenylene radical having up to 6 C atoms which is unsubstituted or mono- or polysubstituted by halogen,
p denotes 0 or 1,
l and k denote 0 to 5,
further comprising at least one compound of formula IIg,

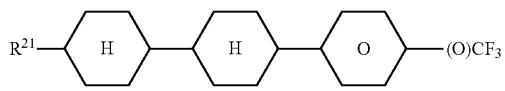

in which
$R^{21}$ is an alkyl or alkenyl radical having up to 15 C atoms which is unsubstituted, or monosubstituted by CN or $CF_3$ or at least monosubstituted by halogen, where, in addition, one or more $CH_2$ groups may be replaced by —O—, —S—,

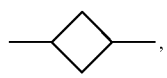

—C≡C—, —OC—O—, or —O—CO— in such a way that O atoms are not linked directly to one another, at least one compound of formula, and at least one compound of formula VI-5,

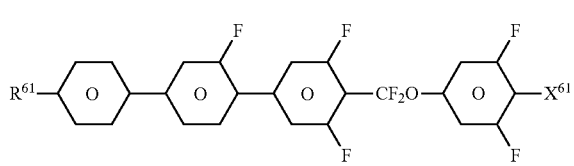

VI-5 in which

R$^{61}$ denotes an unsubstituted alkyl radical having 1 to 15 C atoms, where, in addition, one or more CH$_2$ groups in this radical may each be replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another, X$^{61}$ denotes F, Cl, CN or alkyl, alkenyl, alkenyloxy, alkylalkoxy or alkoxy having 1 to 3 C atoms which is mono- or polysubstituted by F.

2. The medium according to claim 1, wherein the compounds of the formula I1 to I3 are selected from the compounds of the formula I1a to I1g, and/or I3a to I3c,

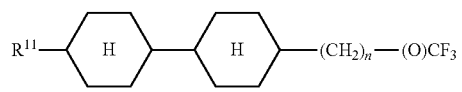
I1a

I1b

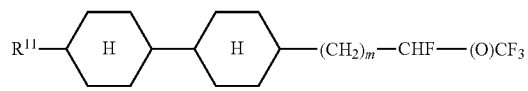
I1c

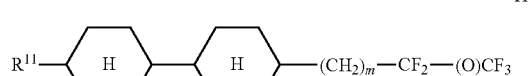
I1d

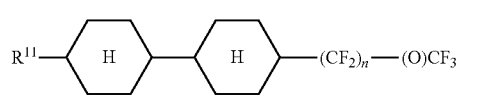
I1e

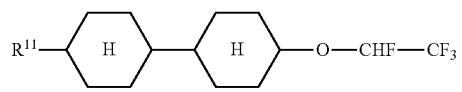
I1f

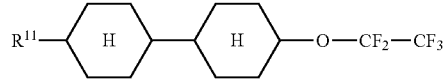
I1g

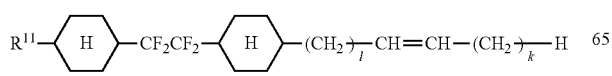
I3a

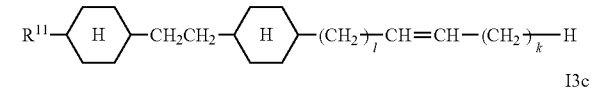
I3b

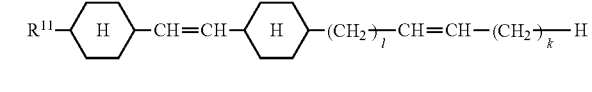
I3c in which

R$^{11}$ has one of the meaning indicated under formula I, m denotes 1 to 5, k, l, and n denote 0 to 5.

3. The medium according to claim 1, further comprising at least one compound of formula IV,

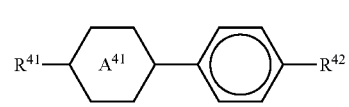
IV in which

R$^{41}$ denotes an alkyl, or alkoxy radical having 1 to 10 C atoms or an alkenyl radical having 2 to 10 C atoms, R$^{42}$ has one of the meanings of R$^{41}$ or X$^{41}$, A$^{41}$ denotes

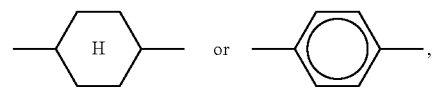

X$^{41}$ denotes F, Cl, CN, a halogenated alkyl, or alkoxy radical having 1 to 6 C atoms or a halogenated alkenyl radical having 2 to 6 C atoms.

4. The medium according to claim 1, further comprising at least one additional compound of formula VI,

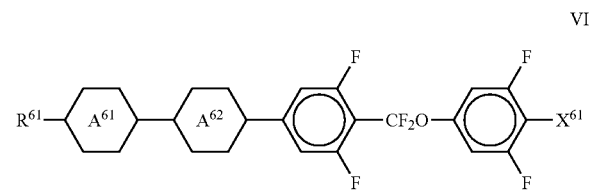
VI in which

R$^{61}$ denotes an unsubstituted alkyl radical having 1 to 15 C atoms, where, in addition, one or more CH$_2$ groups in this radical may each be replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another, A$^{61}$, A$^{62}$ each, independently of one another, denote

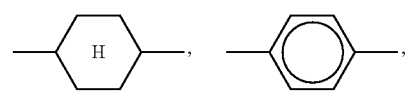

-continued

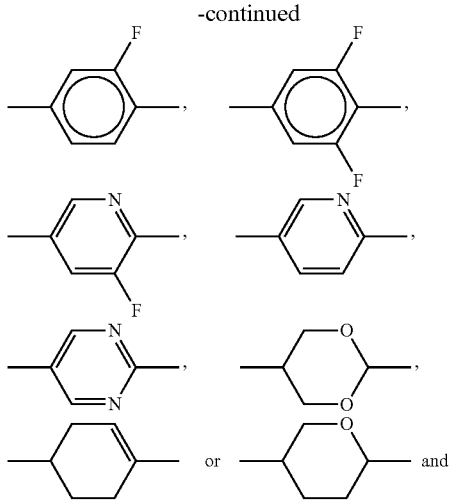

$X^{61}$ denotes F, Cl, CN or alkyl, alkenyl, alkenyloxy, alkylalkoxy or alkoxy having 1 to 3 C atoms which is mono- or polysubstituted by F.

5. The medium according to claim 1, further comprising at least one compound of formula V,

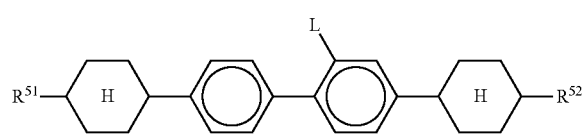

in which
$R^{51}$ and $R^{52}$ each, independently of one another, denote an alkyl or alkoxy radical having 1 to 10 C atoms, an alkenyl radical having 2 to 10 C atoms and
L denotes H or F.

6. A process for the preparation of a medium according to claim 1, comprising mixing compound of formula I2-a1, I2-a3 and I2-b1, and optionally one or more compounds of the formula I1 or I3 and a compound of formula IIg, with one or more of the compounds of the formula IV,

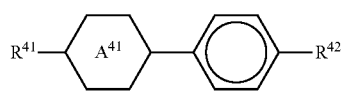

in which
$R^{41}$ denotes an alkyl, or alkoxy radical having 1 to 10 C atoms or an alkenyl radical having 2 to 10 C atoms,
$R^{42}$ has one of the meanings of $R^{41}$ or $X^{41}$,
$A^{41}$ denotes

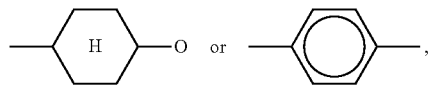

$X^{41}$ denotes F, Cl, CN, a halogenated alkyl, or alkoxy radical having 1 to 6 C atoms or a halogenated alkenyl radical having 2 to 6 C atoms,
and a compound of the formula VI-5,

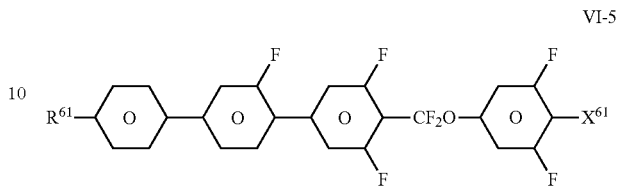

in which
$R^{61}$ denotes an unsubstituted alkyl radical having 1 to 15 C atoms, where, in addition, one or more $CH_2$ groups in this radical may each be replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another,
$X^{61}$ denotes F, Cl, CN or alkyl, alkenyl, alkenyloxy, alkylalkoxy or alkoxy having 1 to 3 C atoms which is mono- or polysubstituted by F.

7. An electro-optical display comprising a dielectric that is a liquid-crystalline medium according to claim 1.

8. An electro-optical display having a re-alignment layer realigning of the liquid crystals, whose field has a re-alignment component parallel to the liquid-crystal layer, said display containing, as dielectric, a liquid-crystalline medium according to claim 1.

9. The medium according to claim 1, comprising
CC-3-V
CC-3-V1
CC-3-2V1
CCP-V2-1
CCQU-3-F
CCP-30CF3
CCGU-3-F
APUQU-2-F
APUQU-3-F
PGUQU-3-F
PGUQU-4-F and
PGUQU-5-F.

10. The medium according to claim 1, comprising
CC-3-V
CC-3-V1
CC-3-2V1
CCQU-3-F
CCP-30CF3
CCGU-3-F
APUQU-2-F
APUQU-3-F
PGUQU-3-F
PGUQU-4-F and
PGUQU-5-F.

* * * * *